United States Patent
Khandekar et al.

(10) Patent No.: US 8,045,512 B2
(45) Date of Patent: Oct. 25, 2011

(54) SCALABLE FREQUENCY BAND OPERATION IN WIRELESS COMMUNICATION SYSTEMS

(75) Inventors: Aamod Khandekar, San Diego, CA (US); Alexei Gorokhov, San Diego, CA (US); Avneesh Agrawal, San Diego, CA (US); Rajiv Vijayan, San Diego, CA (US); Edward Harrison Teague, San Diego, CA (US); Fatih Ulupinar, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 781 days.

(21) Appl. No.: 11/261,805

(22) Filed: Oct. 27, 2005

(65) Prior Publication Data
US 2007/0097908 A1    May 3, 2007

(51) Int. Cl.
*H04Q 7/00* (2006.01)
(52) U.S. Cl. .................................... 370/329; 370/206
(58) Field of Classification Search .................. 370/329, 370/335, 206
See application file for complete search history.

(56) References Cited

U.S. PATENT DOCUMENTS

| | | | |
|---|---|---|---|
| 4,393,276 A | 7/1983 | Steele et al. |
| 4,747,137 A | 5/1988 | Matsunaga |
| 4,783,780 A | 11/1988 | Alexis |
| 4,975,952 A | 12/1990 | Mabey et al. |
| 5,008,900 A | 4/1991 | Critchlow et al. |
| 5,115,248 A | 5/1992 | Roederer et al. |
| 5,268,694 A | 12/1993 | Jan et al. |
| 5,282,222 A | 1/1994 | Fattouche et al. |
| 5,363,408 A | 11/1994 | Paik et al. |
| 5,371,761 A | 12/1994 | Daffara et al. |
| 5,384,410 A | 1/1995 | Kettner |
| 5,384,810 A | 1/1995 | Amrany et al. |
| 5,406,551 A | 4/1995 | Saito et al. |
| 5,410,538 A | 4/1995 | Roche et al. |
| 5,455,839 A | 10/1995 | Eyuboglu et al. |
| 5,491,727 A | 2/1996 | Petit et al. |
| 5,513,379 A | 4/1996 | Benveniste et al. |
| 5,539,748 A | 7/1996 | Raith |
| 5,548,582 A | 8/1996 | Brajal et al. |
| 5,604,744 A | 2/1997 | Andersson et al. |
| 5,612,978 A | 3/1997 | Blanchard et al. |
| 5,625,876 A | 4/1997 | Gilhousen et al. |
| 5,684,491 A | 11/1997 | Newman et al. |
| 5,726,978 A | 3/1998 | Frodigh et al. |

(Continued)

FOREIGN PATENT DOCUMENTS

CA    2348137    11/2001

(Continued)

OTHER PUBLICATIONS

International Search Report—PCT/US06/060340, International Search Authority—European Patent Office—Jun. 28, 2007.

(Continued)

*Primary Examiner* — Phuoc Doan
(74) *Attorney, Agent, or Firm* — Stanton Braden

(57) ABSTRACT

To support mobile stations that are not capable of demodulating the entire bandwidth or that can be made to demodulate less than the entire bandwidth, a system, apparatus and method are provided to schedule users on less than all of the bandwidth. Further, certain users can be scheduled on more of the bandwidth than others.

36 Claims, 8 Drawing Sheets

U.S. PATENT DOCUMENTS

| | | | |
|---|---|---|---|
| 5,732,113 A | 3/1998 | Schmidl et al. |
| 5,768,276 A | 6/1998 | Diachina et al. |
| 5,790,537 A | 8/1998 | Yoon et al. |
| 5,812,938 A | 9/1998 | Gilhousen et al. |
| 5,815,488 A | 9/1998 | Williams et al. |
| 5,822,368 A | 10/1998 | Wang et al. |
| 5,838,268 A | 11/1998 | Frenkel et al. |
| 5,867,478 A | 2/1999 | Baum et al. |
| 5,870,393 A | 2/1999 | Yano et al. |
| 5,887,023 A | 3/1999 | Mabuchi et al. |
| 5,907,585 A | 5/1999 | Suzuki et al. |
| 5,920,571 A | 7/1999 | Houck et al. |
| 5,926,470 A | 7/1999 | Tiedemann, Jr. |
| 5,933,421 A | 8/1999 | Alamouti et al. |
| 5,953,325 A | 9/1999 | Willars et al. |
| 5,955,992 A | 9/1999 | Shattil et al. |
| 5,956,642 A | 9/1999 | Larsson et al. |
| 5,995,992 A | 11/1999 | Eckard et al. |
| 5,999,826 A | 12/1999 | Whinnett |
| 6,002,942 A | 12/1999 | Park et al. |
| 6,016,123 A | 1/2000 | Barton et al. |
| 6,038,150 A | 3/2000 | Yee et al. |
| 6,038,263 A | 3/2000 | Kotzin et al. |
| 6,038,450 A | 3/2000 | Brink et al. |
| 6,052,364 A | 4/2000 | Chalmers et al. |
| 6,061,337 A | 5/2000 | Light et al. |
| 6,067,315 A | 5/2000 | Sandin |
| 6,075,350 A | 6/2000 | Peng et al. |
| 6,075,797 A | 6/2000 | Thomas |
| 6,076,114 A | 6/2000 | Wesley |
| 6,088,345 A | 7/2000 | Sakoda et al. |
| 6,108,323 A | 8/2000 | Gray et al. |
| 6,108,550 A | 8/2000 | Wiorek et al. |
| 6,112,094 A | 8/2000 | Dent et al. |
| 6,128,776 A | 10/2000 | Kang et al. |
| 6,141,317 A | 10/2000 | Marchok et al. |
| 6,154,484 A | 11/2000 | Lee et al. |
| 6,169,910 B1 | 1/2001 | Tamil et al. |
| 6,175,550 B1 | 1/2001 | Van Nee et al. |
| 6,175,650 B1 | 1/2001 | Sindhu et al. |
| 6,176,550 B1 | 1/2001 | Lamart et al. |
| 6,215,983 B1 | 4/2001 | Dogan et al. |
| 6,232,918 B1 | 5/2001 | Wax et al. |
| 6,240,129 B1 | 5/2001 | Reusens et al. |
| 6,249,683 B1 | 6/2001 | Lundby et al. |
| 6,256,478 B1 | 7/2001 | Allen et al. |
| 6,271,946 B1 | 8/2001 | Chang et al. |
| 6,272,122 B1 | 8/2001 | Wee |
| 6,310,704 B1 | 10/2001 | Dogan et al. |
| 6,335,922 B1 | 1/2002 | Tiedemann, Jr. et al. |
| 6,337,659 B1 | 1/2002 | Kim et al. |
| 6,337,983 B1 | 1/2002 | Bonta et al. |
| 6,353,637 B1 | 3/2002 | Mansour et al. |
| 6,363,060 B1 | 3/2002 | Sarkar |
| 6,374,115 B1 | 4/2002 | Barnes et al. |
| 6,377,539 B1 | 4/2002 | Kang et al. |
| 6,388,998 B1 | 5/2002 | Kasturia et al. |
| 6,393,012 B1 | 5/2002 | Pankaj |
| 6,401,062 B1 | 6/2002 | Murashima |
| 6,438,369 B1 | 8/2002 | Huang et al. |
| 6,449,246 B1 | 9/2002 | Barton et al. |
| 6,466,800 B1 | 10/2002 | Sydon et al. |
| 6,473,467 B1 | 10/2002 | Wallace et al. |
| 6,477,317 B1 | 11/2002 | Itokawa |
| 6,478,422 B1 | 11/2002 | Hansen |
| 6,487,243 B1 | 11/2002 | Hwang et al. |
| 6,496,790 B1 | 12/2002 | Kathavate et al. |
| 6,501,810 B1 | 12/2002 | Karim et al. |
| 6,507,601 B2 | 1/2003 | Parsa et al. |
| 6,519,462 B1 | 2/2003 | Lu et al. |
| 6,529,525 B1 | 3/2003 | Pecen et al. |
| 6,535,666 B1 | 3/2003 | Dogan et al. |
| 6,539,008 B1 | 3/2003 | Ahn et al. |
| 6,539,213 B1 | 3/2003 | Richards et al. |
| 6,542,485 B1 | 4/2003 | Mujtaba |
| 6,542,743 B1 | 4/2003 | Soliman |
| 6,563,806 B1 | 5/2003 | Yano et al. |
| 6,563,881 B1 | 5/2003 | Sakoda et al. |
| 6,577,739 B1 | 6/2003 | Hurtig et al. |
| 6,584,140 B1 | 6/2003 | Lee et al. |
| 6,590,881 B1 | 7/2003 | Wallace et al. |
| 6,597,746 B1 | 7/2003 | Amrany et al. |
| 6,601,206 B1 | 7/2003 | Marvasti |
| 6,614,857 B1 | 9/2003 | Buehrer et al. |
| 6,636,568 B2 | 10/2003 | Kadous et al. |
| 6,654,431 B1 | 11/2003 | Barton et al. |
| 6,657,949 B1 | 12/2003 | Jones, IV et al. |
| 6,658,258 B1 | 12/2003 | Chen et al. |
| 6,674,787 B1 | 1/2004 | Dick et al. |
| 6,674,810 B1 | 1/2004 | Cheng et al. |
| 6,675,012 B2 | 1/2004 | Gray et al. |
| 6,678,318 B1 | 1/2004 | Lai et al. |
| 6,693,952 B1 | 2/2004 | Chuah et al. |
| 6,701,165 B1 | 3/2004 | Ho et al. |
| 6,704,571 B1 | 3/2004 | Moon |
| 6,711,400 B1 | 3/2004 | Aura et al. |
| 6,717,908 B2 | 4/2004 | Vijayan et al. |
| 6,724,719 B1 | 4/2004 | Tong et al. |
| 6,744,743 B2 | 6/2004 | Walton et al. |
| 6,748,220 B1 | 6/2004 | Chow et al. |
| 6,751,444 B1 | 6/2004 | Meiyappan et al. |
| 6,751,456 B2 | 6/2004 | Bilgic |
| 6,754,511 B1 | 6/2004 | Halford et al. |
| 6,763,009 B1 | 7/2004 | Bedekar et al. |
| 6,765,969 B1 | 7/2004 | Vook et al. |
| 6,776,165 B2 | 8/2004 | Jin |
| 6,776,765 B2 | 8/2004 | Soukup et al. |
| 6,778,513 B2 | 8/2004 | Kasapi et al. |
| 6,785,341 B2 | 8/2004 | Walton et al. |
| 6,802,035 B2 | 10/2004 | Catreux et al. |
| 6,813,284 B2 | 11/2004 | Vayanos et al. |
| 6,821,535 B2 | 11/2004 | Nurmi et al. |
| 6,828,293 B1 | 12/2004 | Hazenkamp et al. |
| 6,829,293 B2 | 12/2004 | Jones et al. |
| 6,831,943 B1 | 12/2004 | Dabak et al. |
| 6,842,487 B1 | 1/2005 | Larsson |
| 6,850,481 B2 | 2/2005 | Wu et al. |
| 6,862,271 B2 | 3/2005 | Medvedev et al. |
| 6,870,808 B1 | 3/2005 | Liu et al. |
| 6,870,826 B1 | 3/2005 | Ishizu et al. |
| 6,904,097 B2 | 6/2005 | Agami et al. |
| 6,904,283 B2 | 6/2005 | Li et al. |
| 6,904,550 B2 | 6/2005 | Sibecas et al. |
| 6,907,020 B2 | 6/2005 | Periyalwar et al. |
| 6,907,269 B2 | 6/2005 | Yamaguchi et al. |
| 6,909,707 B2 | 6/2005 | Rotstein et al. |
| 6,909,797 B2 | 6/2005 | Romsdahl et al. |
| 6,917,602 B2 | 7/2005 | Toskala et al. |
| 6,917,821 B2 | 7/2005 | Kadous et al. |
| 6,927,728 B2 | 8/2005 | Vook et al. |
| 6,928,047 B1 | 8/2005 | Xia et al. |
| 6,934,266 B2 | 8/2005 | Dulin et al. |
| 6,934,340 B1 | 8/2005 | Dollard et al. |
| 6,940,845 B2 | 9/2005 | Benveniste |
| 6,954,448 B2 | 10/2005 | Farley et al. |
| 6,954,481 B1 | 10/2005 | Laroia et al. |
| 6,954,622 B2 | 10/2005 | Nelson et al. |
| 6,961,364 B1 | 11/2005 | Laroia et al. |
| 6,970,682 B2 | 11/2005 | Crilly, Jr. et al. |
| 6,985,434 B2 | 1/2006 | Wu et al. |
| 6,985,453 B2 | 1/2006 | Lundby et al. |
| 6,985,466 B1 | 1/2006 | Yun et al. |
| 6,987,746 B1 | 1/2006 | Song |
| 6,993,342 B2 | 1/2006 | Kuchibhotla et al. |
| 7,002,900 B2 | 2/2006 | Walton et al. |
| 7,006,529 B2 | 2/2006 | Alastalo et al. |
| 7,006,557 B2 | 2/2006 | Subrahmanya et al. |
| 7,006,848 B2 | 2/2006 | Ling et al. |
| 7,009,500 B2 | 3/2006 | Rao et al. |
| 7,010,048 B1 | 3/2006 | Shattil et al. |
| 7,013,143 B2 | 3/2006 | Love et al. |
| 7,016,318 B2 | 3/2006 | Pankaj et al. |
| 7,016,319 B2 | 3/2006 | Baum et al. |
| 7,016,425 B1 | 3/2006 | Kraiem et al. |
| 7,020,110 B2 | 3/2006 | Walton et al. |
| 7,039,356 B2 | 5/2006 | Nguyen |
| 7,039,370 B2 | 5/2006 | Laroia et al. |

| Patent | Date | Inventors |
|---|---|---|
| 7,042,857 B2 | 5/2006 | Krishnan et al. |
| 7,047,006 B2 | 5/2006 | Classon et al. |
| 7,050,402 B2 | 5/2006 | Schmidl et al. |
| 7,050,405 B2 | 5/2006 | Attar et al. |
| 7,050,759 B2 | 5/2006 | Gaal et al. |
| 7,054,301 B1 | 5/2006 | Sousa et al. |
| 7,061,898 B2 | 6/2006 | Hashem et al. |
| 7,069,009 B2 | 6/2006 | Li et al. |
| 7,072,315 B1 | 7/2006 | Liu et al. |
| 7,079,867 B2 | 7/2006 | Chun et al. |
| 7,095,708 B1 | 8/2006 | Alamouti et al. |
| 7,099,299 B2 | 8/2006 | Liang et al. |
| 7,099,630 B2 | 8/2006 | Brunner et al. |
| 7,103,384 B2 | 9/2006 | Chun |
| 7,106,319 B2 | 9/2006 | Ishiyama |
| 7,113,808 B2 | 9/2006 | Hwang et al. |
| 7,120,395 B2 | 10/2006 | Tong et al. |
| 7,126,928 B2 | 10/2006 | Tiedemann, Jr. et al. |
| 7,131,086 B2 | 10/2006 | Yamasaki et al. |
| 7,133,460 B2 | 11/2006 | Bae et al. |
| 7,139,328 B2 | 11/2006 | Thomas et al. |
| 7,142,864 B2 | 11/2006 | Laroia et al. |
| 7,145,940 B2 | 12/2006 | Gore et al. |
| 7,145,959 B2 | 12/2006 | Harel et al. |
| 7,149,199 B2 | 12/2006 | Sung et al. |
| 7,149,238 B2 | 12/2006 | Agee et al. |
| 7,151,761 B1 | 12/2006 | Palenius |
| 7,151,936 B2 | 12/2006 | Wager et al. |
| 7,154,936 B2 | 12/2006 | Bjerke et al. |
| 7,155,236 B2 | 12/2006 | Chen et al. |
| 7,157,351 B2 | 1/2007 | Cheng et al. |
| 7,161,971 B2 | 1/2007 | Tiedemann, Jr. et al. |
| 7,164,649 B2 | 1/2007 | Walton et al. |
| 7,164,696 B2 | 1/2007 | Sano et al. |
| 7,167,916 B2 | 1/2007 | Willen et al. |
| 7,170,937 B2 | 1/2007 | Zhou |
| 7,177,297 B2 | 2/2007 | Agrawal et al. |
| 7,177,351 B2 | 2/2007 | Kadous |
| 7,180,627 B2 | 2/2007 | Moylan et al. |
| 7,181,170 B2 | 2/2007 | Love et al. |
| 7,184,426 B2 | 2/2007 | Padovani et al. |
| 7,197,282 B2 | 3/2007 | Dent et al. |
| 7,200,177 B2 | 4/2007 | Miyoshi et al. |
| 7,209,712 B2 | 4/2007 | Holtzman |
| 7,215,979 B2 | 5/2007 | Nakagawa et al. |
| 7,230,942 B2 | 6/2007 | Laroia et al. |
| 7,233,634 B1 | 6/2007 | Hassell Sweatman et al. |
| 7,236,747 B1 | 6/2007 | Meacham et al. |
| 7,242,722 B2 | 7/2007 | Krauss et al. |
| 7,243,150 B2 | 7/2007 | Sher et al. |
| 7,248,559 B2 | 7/2007 | Ma et al. |
| 7,248,841 B2 | 7/2007 | Agee et al. |
| 7,254,158 B2 | 8/2007 | Agrawal |
| 7,257,167 B2 | 8/2007 | Lau |
| 7,257,406 B2 | 8/2007 | Ji et al. |
| 7,257,423 B2 | 8/2007 | Iochi et al. |
| 7,260,153 B2 | 8/2007 | Nissani |
| 7,280,467 B2 | 10/2007 | Smee et al. |
| 7,289,570 B2 | 10/2007 | Schmidl et al. |
| 7,289,585 B2 | 10/2007 | Sandhu et al. |
| 7,290,195 B2 | 10/2007 | Guo et al. |
| 7,292,651 B2 | 11/2007 | Li |
| 7,292,863 B2 | 11/2007 | Chen et al. |
| 7,295,509 B2 | 11/2007 | Laroia et al. |
| 7,313,086 B2 | 12/2007 | Aizawa et al. |
| 7,313,126 B2 | 12/2007 | Yun et al. |
| 7,313,174 B2 | 12/2007 | Alard et al. |
| 7,313,407 B2 | 12/2007 | Shapira et al. |
| 7,327,812 B2 | 2/2008 | Auer et al. |
| 7,330,701 B2 | 2/2008 | Mukkavilli et al. |
| 7,336,727 B2 | 2/2008 | Mukkavilli et al. |
| 7,349,371 B2 | 3/2008 | Schein et al. |
| 7,349,667 B2 | 3/2008 | Magee et al. |
| 7,356,000 B2 | 4/2008 | Oprescu-Surcobe et al. |
| 7,356,005 B2 | 4/2008 | Derryberry et al. |
| 7,356,073 B2 | 4/2008 | Heikkila |
| 7,359,327 B2 | 4/2008 | Oshiba |
| 7,366,223 B1 | 4/2008 | Chen et al. |
| 7,366,253 B2 | 4/2008 | Kim et al. |
| 7,366,520 B2 | 4/2008 | Haustein et al. |
| 7,369,531 B2 | 5/2008 | Cho et al. |
| 7,372,911 B1 | 5/2008 | Lindskog et al. |
| 7,372,912 B2 | 5/2008 | Seo et al. |
| 7,379,489 B2 | 5/2008 | Zuniga et al. |
| 7,382,764 B2 | 6/2008 | Uehara |
| 7,392,014 B2 | 6/2008 | Baker et al. |
| 7,394,865 B2 | 7/2008 | Borran et al. |
| 7,403,745 B2 | 7/2008 | Dominique et al. |
| 7,403,748 B1 | 7/2008 | Keskitalo et al. |
| 7,406,119 B2 | 7/2008 | Yamano et al. |
| 7,406,336 B2 | 7/2008 | Astely et al. |
| 7,411,898 B2 | 8/2008 | Erlich et al. |
| 7,412,212 B2 | 8/2008 | Hottinen et al. |
| 7,418,043 B2 | 8/2008 | Shattil et al. |
| 7,418,246 B2 | 8/2008 | Kim et al. |
| 7,423,991 B2 | 9/2008 | Cho et al. |
| 7,426,426 B2 | 9/2008 | Van Baren et al. |
| 7,428,426 B2 | 9/2008 | Kiran et al. |
| 7,433,661 B2 | 10/2008 | Kogiantis et al. |
| 7,437,164 B2 | 10/2008 | Agrawal et al. |
| 7,443,835 B2 | 10/2008 | Lakshmi Narayanan et al. |
| 7,447,270 B1 | 11/2008 | Hottinen |
| 7,450,548 B2 | 11/2008 | Haustein et al. |
| 7,468,943 B2 | 12/2008 | Gu et al. |
| 7,469,011 B2 | 12/2008 | Lin et al. |
| 7,471,963 B2 | 12/2008 | Kim et al. |
| 7,483,408 B2 | 1/2009 | Bevan et al. |
| 7,486,408 B2 | 2/2009 | Van Der Schaar et al. |
| 7,486,735 B2 | 2/2009 | Dubuc et al. |
| 7,492,788 B2 | 2/2009 | Zhang et al. |
| 7,499,393 B2 | 3/2009 | Ozluturk et al. |
| 7,508,748 B2 | 3/2009 | Kadous |
| 7,508,842 B2 | 3/2009 | Baum et al. |
| 7,512,096 B2 | 3/2009 | Kuzminskiy et al. |
| 7,548,506 B2 | 6/2009 | Ma et al. |
| 7,551,546 B2 | 6/2009 | Ma et al. |
| 7,551,564 B2 | 6/2009 | Mattina |
| 7,558,293 B2 | 7/2009 | Choi et al. |
| 7,573,900 B2 | 8/2009 | Kim et al. |
| 7,599,327 B2 | 10/2009 | Zhuang |
| 7,616,955 B2 | 11/2009 | Kim et al. |
| 7,623,442 B2 | 11/2009 | Laroia et al. |
| 7,627,051 B2 | 12/2009 | Shen et al. |
| 7,664,061 B2 | 2/2010 | Hottinen |
| 7,684,507 B2 | 3/2010 | Levy |
| 2001/0021650 A1 | 9/2001 | Bilgic et al. |
| 2001/0024427 A1 | 9/2001 | Suzuki |
| 2001/0030948 A1 | 10/2001 | Tiedemann, Jr. |
| 2001/0047424 A1 | 11/2001 | Alastalo et al. |
| 2001/0055293 A1 | 12/2001 | Parsa et al. |
| 2001/0055294 A1 | 12/2001 | Motoyoshi |
| 2001/0055297 A1 | 12/2001 | Benveniste et al. |
| 2002/0000948 A1 | 1/2002 | Chun et al. |
| 2002/0003792 A1 | 1/2002 | Schmidl et al. |
| 2002/0018157 A1 | 2/2002 | Zhang et al. |
| 2002/0039912 A1 | 4/2002 | Yamaguchi et al. |
| 2002/0044524 A1 | 4/2002 | Laroia et al. |
| 2002/0058525 A1 | 5/2002 | Kasapi et al. |
| 2002/0077152 A1 | 6/2002 | Johnson et al. |
| 2002/0090004 A1 | 7/2002 | Rinchiuso |
| 2002/0090024 A1 | 7/2002 | Tan |
| 2002/0101839 A1 | 8/2002 | Farley et al. |
| 2002/0122381 A1 | 9/2002 | Wu et al. |
| 2002/0122383 A1 | 9/2002 | Wu et al. |
| 2002/0122403 A1 | 9/2002 | Hashem et al. |
| 2002/0147953 A1 | 10/2002 | Catreux et al. |
| 2002/0159422 A1 | 10/2002 | Li et al. |
| 2002/0160769 A1 | 10/2002 | Gray |
| 2002/0168946 A1 | 11/2002 | Aizawa et al. |
| 2002/0172293 A1 | 11/2002 | Kuchi et al. |
| 2002/0172308 A1 | 11/2002 | Harel et al. |
| 2002/0176398 A1 | 11/2002 | Nidda |
| 2002/0181571 A1 | 12/2002 | Yamano et al. |
| 2002/0191569 A1 | 12/2002 | Sung et al. |
| 2003/0003880 A1 | 1/2003 | Ling et al. |
| 2003/0020651 A1 | 1/2003 | Crilly, Jr. et al. |
| 2003/0036359 A1 | 2/2003 | Dent et al. |
| 2003/0040283 A1 | 2/2003 | Kawai et al. |

| Publication No. | Date | Inventor |
|---|---|---|
| 2003/0043732 A1 | 3/2003 | Walton et al. |
| 2003/0063579 A1 | 4/2003 | Lee |
| 2003/0068983 A1 | 4/2003 | Kim et al. |
| 2003/0072254 A1 | 4/2003 | Ma et al. |
| 2003/0072255 A1 | 4/2003 | Ma et al. |
| 2003/0072395 A1 | 4/2003 | Jia et al. |
| 2003/0073409 A1 | 4/2003 | Nobukiyo et al. |
| 2003/0076878 A1 | 4/2003 | Jones et al. |
| 2003/0076890 A1 | 4/2003 | Hochwald et al. |
| 2003/0086371 A1 | 5/2003 | Walton et al. |
| 2003/0096579 A1 | 5/2003 | Ito et al. |
| 2003/0103520 A1 | 6/2003 | Chen et al. |
| 2003/0109226 A1 | 6/2003 | Brunner et al. |
| 2003/0109266 A1 | 6/2003 | Rafiah et al. |
| 2003/0112745 A1 | 6/2003 | Zhuang et al. |
| 2003/0125040 A1 | 7/2003 | Walton et al. |
| 2003/0128658 A1 | 7/2003 | Walton et al. |
| 2003/0133426 A1 | 7/2003 | Schein et al. |
| 2003/0142729 A1 | 7/2003 | Subrahmanya et al. |
| 2003/0157900 A1 | 8/2003 | Gaal et al. |
| 2003/0161281 A1 | 8/2003 | Dulin et al. |
| 2003/0161282 A1 | 8/2003 | Medvedev et al. |
| 2003/0161821 A1 | 8/2003 | Santana Ribeiro |
| 2003/0165189 A1 | 9/2003 | Kadous et al. |
| 2003/0181170 A1 | 9/2003 | Sim |
| 2003/0190897 A1 | 10/2003 | Lei et al. |
| 2003/0202491 A1 | 10/2003 | Tiedemann, Jr. et al. |
| 2003/0202560 A1 | 10/2003 | Tiedemann, Jr. et al. |
| 2003/0216156 A1 | 11/2003 | Chun et al. |
| 2003/0223452 A1 | 12/2003 | Toskala et al. |
| 2003/0228850 A1 | 12/2003 | Hwang |
| 2003/0235255 A1 | 12/2003 | Ketchum et al. |
| 2003/0236080 A1 | 12/2003 | Kadous et al. |
| 2004/0001429 A1 | 1/2004 | Ma et al. |
| 2004/0001460 A1 | 1/2004 | Bevan et al. |
| 2004/0002364 A1 | 1/2004 | Trikkonen et al. |
| 2004/0009783 A1 | 1/2004 | Miyoshi et al. |
| 2004/0010623 A1* | 1/2004 | Sher et al. ............... 709/248 |
| 2004/0015692 A1 | 1/2004 | Green et al. |
| 2004/0017785 A1 | 1/2004 | Zelst et al. |
| 2004/0032443 A1 | 2/2004 | Moylan et al. |
| 2004/0037235 A1 | 2/2004 | Kadous |
| 2004/0038697 A1 | 2/2004 | Attar et al. |
| 2004/0042558 A1 | 3/2004 | Hwang et al. |
| 2004/0048609 A1 | 3/2004 | Kosaka |
| 2004/0048630 A1 | 3/2004 | Shapira et al. |
| 2004/0054999 A1 | 3/2004 | Willen et al. |
| 2004/0057394 A1 | 3/2004 | Holtzman et al. |
| 2004/0058687 A1 | 3/2004 | Kim et al. |
| 2004/0066754 A1 | 4/2004 | Hottinen et al. |
| 2004/0066761 A1 | 4/2004 | Giannakis et al. |
| 2004/0067756 A1 | 4/2004 | Wager et al. |
| 2004/0081073 A1 | 4/2004 | Walton |
| 2004/0086055 A1 | 5/2004 | Li |
| 2004/0087325 A1 | 5/2004 | Cheng et al. |
| 2004/0095907 A1 | 5/2004 | Agee et al. |
| 2004/0097215 A1 | 5/2004 | Abe et al. |
| 2004/0097240 A1 | 5/2004 | Chen et al. |
| 2004/0098505 A1 | 5/2004 | Clemmensen et al. |
| 2004/0105489 A1 | 6/2004 | Kim et al. |
| 2004/0114618 A1 | 6/2004 | Tong et al. |
| 2004/0120411 A1 | 6/2004 | Walton et al. |
| 2004/0128605 A1 | 7/2004 | Sibecas et al. |
| 2004/0131007 A1 | 7/2004 | Smee et al. |
| 2004/0131008 A1 | 7/2004 | Zuniga et al. |
| 2004/0131038 A1 | 7/2004 | Kim et al. |
| 2004/0131110 A1 | 7/2004 | Alard et al. |
| 2004/0136344 A1 | 7/2004 | Kim et al. |
| 2004/0136349 A1 | 7/2004 | Walton et al. |
| 2004/0141548 A1 | 7/2004 | Shattil |
| 2004/0156328 A1 | 8/2004 | Walton et al. |
| 2004/0160914 A1 | 8/2004 | Sarkar et al. |
| 2004/0160933 A1 | 8/2004 | Odenwalder et al. |
| 2004/0162083 A1 | 8/2004 | Chen et al. |
| 2004/0165564 A1 | 8/2004 | Kim et al. |
| 2004/0166867 A1 | 8/2004 | Hawe et al. |
| 2004/0166887 A1 | 8/2004 | Laroia et al. |
| 2004/0170152 A1 | 9/2004 | Nagao et al. |
| 2004/0170157 A1 | 9/2004 | Kim et al. |
| 2004/0171384 A1 | 9/2004 | Holma et al. |
| 2004/0171385 A1 | 9/2004 | Haustein et al. |
| 2004/0178954 A1 | 9/2004 | Vook et al. |
| 2004/0179506 A1 | 9/2004 | Padovani et al. |
| 2004/0179627 A1 | 9/2004 | Ketchum et al. |
| 2004/0185792 A1 | 9/2004 | Alexiou et al. |
| 2004/0190486 A1 | 9/2004 | Oshiba |
| 2004/0190640 A1 | 9/2004 | Dubuc et al. |
| 2004/0202257 A1 | 10/2004 | Mehta et al. |
| 2004/0203347 A1 | 10/2004 | Nguyen |
| 2004/0218520 A1 | 11/2004 | Aizawa et al. |
| 2004/0219819 A1 | 11/2004 | Di Mascio et al. |
| 2004/0219919 A1 | 11/2004 | Whinnett et al. |
| 2004/0228267 A1 | 11/2004 | Agrawal |
| 2004/0229615 A1 | 11/2004 | Agrawal et al. |
| 2004/0240419 A1 | 12/2004 | Abrishamkar et al. |
| 2004/0240572 A1 | 12/2004 | Brutel et al. |
| 2004/0248604 A1 | 12/2004 | Vaidyanathan et al. |
| 2004/0252529 A1 | 12/2004 | Huber et al. |
| 2004/0252629 A1 | 12/2004 | Hasegawa et al. |
| 2004/0252655 A1 | 12/2004 | Lim et al. |
| 2004/0257979 A1 | 12/2004 | Ro et al. |
| 2004/0264507 A1 | 12/2004 | Cho et al. |
| 2004/0264585 A1 | 12/2004 | Borran et al. |
| 2005/0002412 A1 | 1/2005 | Sagfors et al. |
| 2005/0002440 A1 | 1/2005 | Alamouti et al. |
| 2005/0002467 A1 | 1/2005 | Seo et al. |
| 2005/0003782 A1 | 1/2005 | Wintzell |
| 2005/0008091 A1 | 1/2005 | Boutros et al. |
| 2005/0025093 A1 | 2/2005 | Yun et al. |
| 2005/0030964 A1 | 2/2005 | Tiedemann et al. |
| 2005/0041611 A1 | 2/2005 | Sandhu et al. |
| 2005/0041618 A1 | 2/2005 | Wei et al. |
| 2005/0041750 A1 | 2/2005 | Lau et al. |
| 2005/0047517 A1 | 3/2005 | Georgios et al. |
| 2005/0052991 A1 | 3/2005 | Kadous |
| 2005/0053081 A1 | 3/2005 | Andersson et al. |
| 2005/0053151 A1 | 3/2005 | Lin et al. |
| 2005/0063298 A1 | 3/2005 | Ling et al. |
| 2005/0073973 A1 | 4/2005 | Laroia et al. |
| 2005/0073976 A1 | 4/2005 | Fujii |
| 2005/0075073 A1 | 4/2005 | Kadous et al. |
| 2005/0085195 A1 | 4/2005 | Tong et al. |
| 2005/0085236 A1 | 4/2005 | Gerlach et al. |
| 2005/0088959 A1 | 4/2005 | Kadous |
| 2005/0111397 A1 | 5/2005 | Attar et al. |
| 2005/0113100 A1 | 5/2005 | Oprescu-Surcobe et al. |
| 2005/0122898 A1 | 6/2005 | Jang et al. |
| 2005/0128683 A1 | 6/2005 | Watanabe et al. |
| 2005/0128983 A1 | 6/2005 | Kim et al. |
| 2005/0135324 A1 | 6/2005 | Kim et al. |
| 2005/0135498 A1 | 6/2005 | Yee |
| 2005/0138671 A1 | 6/2005 | Love et al. |
| 2005/0147024 A1 | 7/2005 | Jung et al. |
| 2005/0147025 A1 | 7/2005 | Auer et al. |
| 2005/0152484 A1 | 7/2005 | Sandhu et al. |
| 2005/0157807 A1 | 7/2005 | Shim et al. |
| 2005/0174981 A1 | 8/2005 | Heath et al. |
| 2005/0175070 A1 | 8/2005 | Grob et al. |
| 2005/0180311 A1 | 8/2005 | Wang et al. |
| 2005/0180313 A1 | 8/2005 | Kim et al. |
| 2005/0181799 A1 | 8/2005 | Laroia et al. |
| 2005/0195886 A1 | 9/2005 | Lampinen et al. |
| 2005/0201296 A1 | 9/2005 | Vannithamby et al. |
| 2005/0207367 A1 | 9/2005 | Onggosanusi et al. |
| 2005/0215251 A1 | 9/2005 | Krishnan et al. |
| 2005/0226204 A1 | 10/2005 | Uehara et al. |
| 2005/0239465 A1 | 10/2005 | Lee et al. |
| 2005/0243791 A1 | 11/2005 | Park et al. |
| 2005/0246548 A1 | 11/2005 | Laitinen et al. |
| 2005/0249266 A1 | 11/2005 | Brown et al. |
| 2005/0254416 A1 | 11/2005 | Laroia et al. |
| 2005/0254467 A1 | 11/2005 | Li et al. |
| 2005/0254477 A1 | 11/2005 | Lee et al. |
| 2005/0254556 A1 | 11/2005 | Fujii et al. |
| 2005/0259005 A1 | 11/2005 | Chiang et al. |
| 2005/0259723 A1 | 11/2005 | Blanchard et al. |
| 2005/0259757 A1 | 11/2005 | Wu et al. |
| 2005/0265220 A1 | 12/2005 | Erlich et al. |

| | | |
|---|---|---|
| 2005/0265293 A1 | 12/2005 | Ro et al. |
| 2005/0271012 A1 | 12/2005 | Agrawal et al. |
| 2005/0276347 A1 | 12/2005 | Mujtaba et al. |
| 2005/0276348 A1 | 12/2005 | Vandenameele |
| 2005/0277423 A1 | 12/2005 | Sandhu et al. |
| 2005/0281029 A1 | 12/2005 | Inamoto et al. |
| 2005/0281290 A1 | 12/2005 | Khandekar et al. |
| 2005/0282500 A1 | 12/2005 | Wang et al. |
| 2005/0286408 A1 | 12/2005 | Jin et al. |
| 2005/0286465 A1 | 12/2005 | Zhuang |
| 2005/0289256 A1 | 12/2005 | Cudak et al. |
| 2006/0002451 A1 | 1/2006 | Fukuta et al. |
| 2006/0013285 A1 | 1/2006 | Kobayashi et al. |
| 2006/0018336 A1 | 1/2006 | Sutivong et al. |
| 2006/0018347 A1 | 1/2006 | Agrawal |
| 2006/0018397 A1 | 1/2006 | Sampath et al. |
| 2006/0026344 A1 | 2/2006 | Sun Hsu et al. |
| 2006/0029289 A1 | 2/2006 | Yamaguchi et al. |
| 2006/0034163 A1 | 2/2006 | Gore et al. |
| 2006/0034164 A1 | 2/2006 | Ozluturk et al. |
| 2006/0039332 A1 | 2/2006 | Kotzin |
| 2006/0039344 A1 | 2/2006 | Khan |
| 2006/0040655 A1 | 2/2006 | Kim et al. |
| 2006/0045003 A1 | 3/2006 | Choi et al. |
| 2006/0050770 A1 | 3/2006 | Wallace et al. |
| 2006/0056340 A1 | 3/2006 | Hottinen et al. |
| 2006/0057958 A1 | 3/2006 | Ngo et al. |
| 2006/0067421 A1 | 3/2006 | Walton et al. |
| 2006/0078075 A1 | 4/2006 | Stamoulis et al. |
| 2006/0083159 A1 | 4/2006 | Laroia et al. |
| 2006/0092054 A1 | 5/2006 | Li et al. |
| 2006/0093065 A1 | 5/2006 | Thomas et al. |
| 2006/0104333 A1 | 5/2006 | Rainbolt et al. |
| 2006/0109814 A1 | 5/2006 | Kuzminskiy et al. |
| 2006/0114858 A1 | 6/2006 | Walton et al. |
| 2006/0120469 A1 | 6/2006 | Maltsev et al. |
| 2006/0126491 A1 | 6/2006 | Ro et al. |
| 2006/0133269 A1 | 6/2006 | Prakash et al. |
| 2006/0133455 A1 | 6/2006 | Agrawal et al. |
| 2006/0133521 A1 | 6/2006 | Sampath et al. |
| 2006/0140289 A1 | 6/2006 | Mandyam et al. |
| 2006/0155534 A1 | 7/2006 | Lin et al. |
| 2006/0156199 A1 | 7/2006 | Palanki et al. |
| 2006/0172704 A1 | 8/2006 | Nishio et al. |
| 2006/0203708 A1 | 9/2006 | Sampath et al. |
| 2006/0203794 A1 | 9/2006 | Sampath et al. |
| 2006/0203891 A1 | 9/2006 | Sampath et al. |
| 2006/0203932 A1 | 9/2006 | Palanki et al. |
| 2006/0209754 A1 | 9/2006 | Ji et al. |
| 2006/0209764 A1 | 9/2006 | Kim et al. |
| 2006/0215777 A1 | 9/2006 | Krishnamoorthi |
| 2006/0218459 A1 | 9/2006 | Hedberg |
| 2006/0233124 A1 | 10/2006 | Palanki et al. |
| 2006/0233131 A1 | 10/2006 | Gore et al. |
| 2006/0270427 A1 | 11/2006 | Shida et al. |
| 2006/0285485 A1 | 12/2006 | Agrawal et al. |
| 2006/0285515 A1 | 12/2006 | Julian et al. |
| 2006/0286974 A1 | 12/2006 | Gore et al. |
| 2006/0286982 A1 | 12/2006 | Prakash et al. |
| 2006/0286995 A1 | 12/2006 | Onggosanusi et al. |
| 2006/0291371 A1 | 12/2006 | Sutivong et al. |
| 2006/0292989 A1 | 12/2006 | Gerlach et al. |
| 2007/0004430 A1 | 1/2007 | Hyun et al. |
| 2007/0005749 A1 | 1/2007 | Sampath |
| 2007/0009011 A1 | 1/2007 | Coulson |
| 2007/0019596 A1 | 1/2007 | Barriac et al. |
| 2007/0025345 A1 | 2/2007 | Bachl et al. |
| 2007/0041311 A1 | 2/2007 | Baum et al. |
| 2007/0041404 A1 | 2/2007 | Palanki et al. |
| 2007/0049218 A1 | 3/2007 | Gorokhov et al. |
| 2007/0053282 A1 | 3/2007 | Tong et al. |
| 2007/0064669 A1 | 3/2007 | Classon et al. |
| 2007/0071147 A1 | 3/2007 | Sampath et al. |
| 2007/0097853 A1 | 5/2007 | Khandekar et al. |
| 2007/0097889 A1 | 5/2007 | Wang et al. |
| 2007/0097910 A1 | 5/2007 | Ji et al. |
| 2007/0097922 A1 | 5/2007 | Parekh et al. |
| 2007/0097981 A1 | 5/2007 | Papasakellariou et al. |
| 2007/0098050 A1 | 5/2007 | Khandekar et al. |
| 2007/0098120 A1 | 5/2007 | Wang |
| 2007/0099666 A1 | 5/2007 | Astely et al. |
| 2007/0115795 A1 | 5/2007 | Gore et al. |
| 2007/0159969 A1 | 7/2007 | Das et al. |
| 2007/0160115 A1 | 7/2007 | Palanki et al. |
| 2007/0165738 A1 | 7/2007 | Barriac et al. |
| 2007/0177631 A1 | 8/2007 | Popovic et al. |
| 2007/0177681 A1 | 8/2007 | Choi et al. |
| 2007/0183303 A1* | 8/2007 | Pi et al. .................... 370/206 |
| 2007/0183386 A1 | 8/2007 | Muharemovic et al. |
| 2007/0211616 A1 | 9/2007 | Khandekar et al. |
| 2007/0211667 A1 | 9/2007 | Agrawal et al. |
| 2007/0230324 A1 | 10/2007 | Li et al. |
| 2007/0263743 A1 | 11/2007 | Lee et al. |
| 2007/0280336 A1 | 12/2007 | Zhang et al. |
| 2008/0039129 A1 | 2/2008 | Li et al. |
| 2008/0063099 A1 | 3/2008 | Laroia et al. |
| 2008/0095223 A1 | 4/2008 | Tong et al. |
| 2008/0095262 A1 | 4/2008 | Ho et al. |
| 2008/0181139 A1 | 7/2008 | Rangarajan et al. |
| 2008/0214222 A1 | 9/2008 | Atarashi et al. |
| 2008/0253279 A1 | 10/2008 | Ma et al. |
| 2008/0267157 A1 | 10/2008 | Lee et al. |
| 2008/0299983 A1 | 12/2008 | Kwak et al. |
| 2009/0003466 A1 | 1/2009 | Taherzadehboroujeni et al. |
| 2009/0010351 A1 | 1/2009 | Laroia et al. |
| 2009/0110103 A1 | 4/2009 | Maltsev et al. |
| 2009/0180459 A1 | 7/2009 | Orlik et al. |
| 2009/0197646 A1 | 8/2009 | Tamura et al. |
| 2009/0262699 A1 | 10/2009 | Wengerter et al. |
| 2009/0287977 A1 | 11/2009 | Chang et al. |
| 2010/0254263 A1 | 10/2010 | Chen et al. |

FOREIGN PATENT DOCUMENTS

| | | |
|---|---|---|
| CA | 2477536 | 9/2003 |
| CA | 2540688 | 5/2005 |
| CA | 2577369 | 3/2006 |
| CL | 14001993 | 12/1994 |
| CL | 19931400 | 12/1994 |
| CL | 8461997 | 1/1998 |
| CL | 9531997 | 1/1998 |
| CL | 27102004 | 8/2005 |
| CL | 22892004 | 9/2005 |
| CL | 30862004 | 10/2005 |
| CL | 29932005 | 5/2006 |
| CL | 29012006 | 10/2006 |
| CL | 29022006 | 10/2006 |
| CL | 29032006 | 10/2006 |
| CL | 29042006 | 10/2006 |
| CL | 29062006 | 10/2006 |
| CL | 29082006 | 10/2006 |
| CL | 15202006 | 12/2006 |
| CL | 22032006 | 2/2007 |
| CL | 15212006 | 3/2007 |
| CL | 14922006 | 4/2007 |
| CL | 14892006 | 5/2007 |
| CL | 14902006 | 5/2007 |
| CL | 33882005 | 6/2007 |
| CL | 29072006 | 1/2010 |
| CN | 1267437 | 9/2000 |
| CN | 1284795 | 2/2001 |
| CN | 1296682 | 5/2001 |
| CN | 1344451 | 4/2002 |
| CN | 1346221 | 4/2002 |
| CN | 1383631 | 12/2002 |
| CN | 1386344 | 12/2002 |
| CN | 1402916 A | 3/2003 |
| CN | 1424835 | 6/2003 |
| CN | 1132474 C | 12/2003 |
| CN | 1467938 A | 1/2004 |
| CN | 1487755 A | 4/2004 |
| CN | 1520220 | 8/2004 |
| CN | 1525678 | 9/2004 |
| CN | 1636346 | 7/2005 |
| CN | 1647436 | 7/2005 |
| DE | 19800653 A1 | 7/1999 |
| DE | 19800953 | 7/1999 |
| DE | 19957288 | 5/2001 |
| DE | 10254384 | 6/2004 |

| | | | | | | |
|---|---|---|---|---|---|---|
| EP | 0488976 | 6/1992 | | JP | 2004297756 | 10/2004 |
| EP | 0568291 A2 | 11/1993 | | JP | 2004534456 | 11/2004 |
| EP | 0786889 A1 | 7/1997 | | JP | 2005006337 | 1/2005 |
| EP | 0805576 A2 | 11/1997 | | JP | 2005020530 A | 1/2005 |
| EP | 0807989 A1 | 11/1997 | | JP | 2005502218 T | 1/2005 |
| EP | 0844796 | 5/1998 | | JP | 2005506757 | 3/2005 |
| EP | 0981222 A2 | 2/2000 | | JP | 2005130491 A | 5/2005 |
| EP | 1001570 A2 | 5/2000 | | JP | 2005197772 | 7/2005 |
| EP | 1061687 | 12/2000 | | JP | 2005203961 | 7/2005 |
| EP | 1091516 A1 | 4/2001 | | JP | 2005521327 | 7/2005 |
| EP | 1093241 A1 | 4/2001 | | JP | 2005521358 | 7/2005 |
| EP | 1148673 A2 | 10/2001 | | JP | 2006505172 | 2/2006 |
| EP | 1187506 A1 | 3/2002 | | JP | 2007503790 | 2/2007 |
| EP | 1204217 A | 5/2002 | | JP | 2007519281 | 7/2007 |
| EP | 1255369 | 11/2002 | | JP | 2007527127 | 9/2007 |
| EP | 1267513 | 12/2002 | | JP | 2008535398 | 8/2008 |
| EP | 1286490 | 2/2003 | | JP | 2008546314 | 12/2008 |
| EP | 1335504 A2 | 8/2003 | | KR | 0150275 B1 | 11/1998 |
| EP | 1376920 | 1/2004 | | KR | 20000060428 | 10/2000 |
| EP | 1445873 A2 | 8/2004 | | KR | 100291476 B1 | 3/2001 |
| EP | 1478204 A2 | 11/2004 | | KR | 20010056333 | 4/2001 |
| EP | 1507421 | 2/2005 | | KR | 20010087715 A | 9/2001 |
| EP | 1513356 A2 | 3/2005 | | KR | 20030007965 | 1/2003 |
| EP | 1533950 | 5/2005 | | KR | 20030035969 A | 5/2003 |
| EP | 1538863 | 6/2005 | | KR | 20040063057 | 7/2004 |
| EP | 1542488 A1 | 6/2005 | | KR | 200471652 | 8/2004 |
| EP | 1601149 A2 | 11/2005 | | KR | 20040103441 A | 12/2004 |
| EP | 1643669 A1 | 4/2006 | | KR | 20050061559 | 6/2005 |
| FR | 2584884 | 1/1987 | | KR | 20050063826 A | 6/2005 |
| GB | 2279540 A | 1/1995 | | KR | 100606099 | 7/2006 |
| GB | 2348776 | 10/2000 | | RU | 95121152 | 12/1997 |
| GB | 2412541 | 9/2005 | | RU | 2141168 | 11/1999 |
| GB | 2412541 A | 9/2005 | | RU | 2141706 C1 | 11/1999 |
| JP | 04301931 A | 10/1992 | | RU | 2159007 C2 | 11/2000 |
| JP | 7336323 A | 12/1995 | | RU | 2162275 C2 | 1/2001 |
| JP | 08288927 | 11/1996 | | RU | 2192094 C1 | 10/2002 |
| JP | 9008725 A | 1/1997 | | RU | 2197778 C2 | 1/2003 |
| JP | 9131342 | 5/1997 | | RU | 2207723 C1 | 6/2003 |
| JP | 9182148 A | 7/1997 | | RU | 2208913 | 7/2003 |
| JP | 09214404 | 8/1997 | | RU | 2210866 C2 | 8/2003 |
| JP | 10117162 | 5/1998 | | RU | 2216101 C2 | 11/2003 |
| JP | 10322304 | 12/1998 | | RU | 2216105 C2 | 11/2003 |
| JP | 11196109 | 7/1999 | | RU | 2225080 C2 | 2/2004 |
| JP | 11508417 T | 7/1999 | | RU | 2235429 | 8/2004 |
| JP | 11239155 A | 8/1999 | | RU | 2237379 C2 | 9/2004 |
| JP | 11298954 | 10/1999 | | RU | 2238611 C1 | 10/2004 |
| JP | 11331927 A | 11/1999 | | RU | 2242091 C2 | 12/2004 |
| JP | 2000184425 | 6/2000 | | RU | 2003125268 | 2/2005 |
| JP | 2000332724 A | 11/2000 | | RU | 2285388 | 3/2005 |
| JP | 2001016644 A2 | 1/2001 | | RU | 2292655 | 1/2007 |
| JP | 2001057545 A | 2/2001 | | RU | 2335864 C2 | 10/2008 |
| JP | 2001238269 | 8/2001 | | SU | 1320883 | 6/1987 |
| JP | 2001249802 A | 9/2001 | | TW | 508960 | 11/2002 |
| JP | 2001526012 | 12/2001 | | TW | 508960 B | 11/2002 |
| JP | 2002026790 | 1/2002 | | TW | 510132 | 11/2002 |
| JP | 2002515203 T | 5/2002 | | TW | 200302642 | 8/2003 |
| JP | 2002534941 | 10/2002 | | TW | 200401572 | 1/2004 |
| JP | 2003032218 | 1/2003 | | TW | 1232040 | 5/2005 |
| JP | 2003500909 | 1/2003 | | TW | 248266 | 1/2006 |
| JP | 200369472 | 3/2003 | | TW | 200718128 | 5/2007 |
| JP | 2003101515 | 4/2003 | | WO | WO9408432 | 4/1994 |
| JP | 2003169367 A | 6/2003 | | WO | WO-9521494 A1 | 8/1995 |
| JP | 2003174426 | 6/2003 | | WO | WO-9613920 A1 | 5/1996 |
| JP | 2003199173 A | 7/2003 | | WO | WO9701256 | 1/1997 |
| JP | 2003520523 | 7/2003 | | WO | WO9737456 A2 | 10/1997 |
| JP | 2003249907 A | 9/2003 | | WO | WO-9746033 A2 | 12/1997 |
| JP | 2003347985 A | 12/2003 | | WO | WO-9800946 A2 | 1/1998 |
| JP | 2003348047 | 12/2003 | | WO | WO-9814026 A1 | 4/1998 |
| JP | 2004023716 | 1/2004 | | WO | WO9853561 | 11/1998 |
| JP | 2004048716 | 2/2004 | | WO | WO9854919 A2 | 12/1998 |
| JP | 200472457 | 3/2004 | | WO | WO-9941871 A1 | 8/1999 |
| JP | 2004096142 | 3/2004 | | WO | WO-9944313 A1 | 9/1999 |
| JP | 2004153676 | 5/2004 | | WO | WO-9944383 A1 | 9/1999 |
| JP | 2004158901 A | 6/2004 | | WO | WO-9952250 A1 | 10/1999 |
| JP | 2004194262 A | 7/2004 | | WO | WO9953713 A2 | 10/1999 |
| JP | 2004221972 | 8/2004 | | WO | WO-9959265 A1 | 11/1999 |
| JP | 2004266818 | 9/2004 | | WO | WO9960729 A1 | 11/1999 |
| JP | 2004529524 T | 9/2004 | | WO | WO0002397 | 1/2000 |
| JP | 2004297276 A | 10/2004 | | WO | WO0070897 | 11/2000 |

| | | |
|---|---|---|
| WO | WO0126269 | 4/2001 |
| WO | WO-0139523 A2 | 5/2001 |
| WO | WO0145300 | 6/2001 |
| WO | 0148969 | 7/2001 |
| WO | WO-0158054 A1 | 8/2001 |
| WO | WO-0160106 A1 | 8/2001 |
| WO | 0182544 A | 11/2001 |
| WO | WO0182543 | 11/2001 |
| WO | WO-0189112 A1 | 11/2001 |
| WO | WO0193505 | 12/2001 |
| WO | WO027375 A1 | 1/2002 |
| WO | WO-0204936 A1 | 1/2002 |
| WO | WO0215616 A2 | 2/2002 |
| WO | 0219746 | 3/2002 |
| WO | WO-0231991 A2 | 4/2002 |
| WO | WO-0233848 A2 | 4/2002 |
| WO | 0249306 | 6/2002 |
| WO | WO0249305 | 6/2002 |
| WO | WO0249385 A2 | 6/2002 |
| WO | WO02060138 | 8/2002 |
| WO | 02082743 A | 10/2002 |
| WO | WO0293782 A1 | 11/2002 |
| WO | WO02100027 A1 | 12/2002 |
| WO | 03001696 | 1/2003 |
| WO | WO03001696 A2 | 1/2003 |
| WO | WO03001761 A1 | 1/2003 |
| WO | WO-03001981 A2 | 1/2003 |
| WO | WO-03003617 A2 | 1/2003 |
| WO | WO03019819 | 3/2003 |
| WO | WO03030414 | 4/2003 |
| WO | WO03043262 | 5/2003 |
| WO | WO03043369 | 5/2003 |
| WO | WO03058871 A1 | 7/2003 |
| WO | WO03067783 | 8/2003 |
| WO | WO03069832 A1 | 8/2003 |
| WO | WO03073646 | 9/2003 |
| WO | WO03075479 | 9/2003 |
| WO | WO03085876 | 10/2003 |
| WO | WO03094384 | 11/2003 |
| WO | WO03103331 | 12/2003 |
| WO | WO2004004370 | 1/2004 |
| WO | WO-2004008681 A1 | 1/2004 |
| WO | WO2004015912 | 2/2004 |
| WO | WO2004016007 | 2/2004 |
| WO | WO2004021605 A1 | 3/2004 |
| WO | WO-2004030238 A1 | 4/2004 |
| WO | WO-2004032443 A1 | 4/2004 |
| WO | 2004040827 | 5/2004 |
| WO | WO2004038954 | 5/2004 |
| WO | WO-2004038972 A1 | 5/2004 |
| WO | WO-2004038988 A2 | 5/2004 |
| WO | WO-2004040690 A2 | 5/2004 |
| WO | WO2004047354 | 6/2004 |
| WO | WO2004049618 A1 | 6/2004 |
| WO | WO-2004051872 A2 | 6/2004 |
| WO | WO2004062255 | 7/2004 |
| WO | WO2004064294 | 7/2004 |
| WO | WO2004064295 | 7/2004 |
| WO | WO2004066520 | 8/2004 |
| WO | WO-2004073276 A1 | 8/2004 |
| WO | WO2004075442 | 9/2004 |
| WO | WO2004075448 | 9/2004 |
| WO | WO2004075468 | 9/2004 |
| WO | WO2004075596 | 9/2004 |
| WO | WO2004084509 | 9/2004 |
| WO | 2004086711 | 10/2004 |
| WO | WO-2004086706 A1 | 10/2004 |
| WO | 2004095851 | 11/2004 |
| WO | 2004098072 | 11/2004 |
| WO | WO2004095730 A1 | 11/2004 |
| WO | WO2004095854 | 11/2004 |
| WO | WO2004098222 | 11/2004 |
| WO | WO2004102815 | 11/2004 |
| WO | WO2005002253 A1 | 1/2005 |
| WO | 2005015941 | 2/2005 |
| WO | WO-2005015795 A1 | 2/2005 |
| WO | WO-2005015797 A1 | 2/2005 |
| WO | WO2005015810 | 2/2005 |
| WO | WO2005020488 A1 | 3/2005 |
| WO | WO2005020490 | 3/2005 |
| WO | WO2005043855 | 5/2005 |
| WO | WO2005046080 | 5/2005 |
| WO | 2005055527 | 6/2005 |
| WO | 2005065062 | 7/2005 |
| WO | WO-2005069538 A1 | 7/2005 |
| WO | WO2005074184 | 8/2005 |
| WO | 2005096538 | 10/2005 |
| WO | WO2005122628 | 12/2005 |
| WO | WO2006019710 | 2/2006 |
| WO | 2006026344 | 3/2006 |
| WO | WO2006044487 | 4/2006 |
| WO | WO2006069300 | 6/2006 |
| WO | WO2006069397 | 6/2006 |
| WO | WO2006077696 | 7/2006 |
| WO | WO-2006096784 A1 | 9/2006 |
| WO | WO-2006099349 A1 | 9/2006 |
| WO | WO-2006099545 A1 | 9/2006 |
| WO | WO-2006099577 A1 | 9/2006 |
| WO | WO-2006127544 A2 | 11/2006 |
| WO | 2006134032 | 12/2006 |
| WO | 2006138196 | 12/2006 |
| WO | 2006138573 | 12/2006 |
| WO | WO2006138581 A2 | 12/2006 |
| WO | WO2007024934 | 3/2007 |
| WO | WO-2007024935 A2 | 3/2007 |
| WO | WO2007025160 | 3/2007 |
| WO | WO-2007051159 A2 | 5/2007 |

OTHER PUBLICATIONS

International Search Report—PCT/US06/060341, International Search Authority—European Patent Office—Aug. 5, 2007.
Digital cellular telecommunications system (Phase 2+); Mobile radio interface layer 3 specification (GSM 04.08 version 7.7.1 Release 1998); ETSI EN 300 940 V7.7.7 (Oct. 2000), pp. 1,2,91-93.
Favre et al: "Self-Adaptive Transmission Procedure" IBM Technical Disclosure Bulletin, IBM Corporation, Sep. 1976, vol. 19, No. 4, pp. 1283-1284, New York, New York.
Groe, et al., "CDMA Mobile Radio Design," Sep. 26, 2001, Artech House, Norwood, MA 02062, pp. 257-259.
Laroia, R. et al.. "An integrated approach based on cross-layer optimization—Designing a mobile broadband wireless access network" IEEE Signal Processing Magazine, IEEE Service Center, Piscataway, NJ, US, vol. 21, No. 5, Sep. 2004, pp. 20-28, XP011118149.
Lau, et al., "On the Design of MIMO Block-Fading Channels with Feedback-Link Capacity Constraint," IEEE Transactions on Communications, IEEE Service Center, Piscataway, NJ, US, v. 52. No. 1, Jan. 2004, pp. 62-70, XP001189908.
Lettieri et al: "Adaptive frame length control for improving wireless link throughput, range, and energy efficiency", INFOCOM 98, 17th Annual Joint Conference of the IEEE Computer and Communications Societies, Mar. 29-Apr. 2, 1998, pp. 564-571, vol. 2, IEEE San Francisco, CA, New York, New York.
Molisch, et al., MIMO systems with antenna selection, IEEE Microwave Magazine, URL: http://ieeexplore.ieee.org/iel5/6668/28677/01284943.pdf, Retrieved on Dec. 8, 2006, pp. 46-56 (2004).
Tomcik, J.: "QFDD Technology Overview Presentation," IEEE 802.20 Working Group on Mobile Broadband Wireless Access, Slides/pp. 1-73, Nov. 15, 2005.
Tomcik, J.: "MBFDD and MBTDD Wideband Mode: Technology Overview," IEEE 802.20 Working Group Mobile Broadband Wireless Access, Jan. 2006, pp. 1-109, XP002429968.
Toufik I et al., "Channel allocation algorithms for multi-carrier systems", Vehicular Technology Conference, 2004. VTC2004-Fall. 2004 IEEE 60TH Los Angeles, CA, USA Sep. 26-29, 2004, pp. 1129-1133, XP010786798, ISBN: 07-7803-8521-7.
TIA-1121.001 "Physical Layer for Ultra Mobile Broadband (UMB) Air Interface Specification," 3GPP2 C.S0084-001-0, Version 2 0 (Aug. 2007).
TIA-1121.002 "Medium Access Control Layer for Ultra Mobile Broadband (UMB) Air Interface Specification," 3GPP2 C.S0084-002-0. Version 2.0 (Aug. 2007).
International Preliminary Report on Patentability—PCT/US06/060340, International Bureau of WIPO, Geneva Switzerland—Apr. 29, 2008.

International Preliminary Report on Patentability—PCT/US06/060341, International Bureau of WIPO, Geneva Switzerland—Apr. 29, 2008.
Written Opinion—PCT/US06/060340, International Search Authority—European Patent Office—Jun. 28, 2007.
Written Opinon—PCT/US06/060341, International Search Authority—European Patent Office—May 8, 2007.
Das,Arnab, et al. "Adaptive, asynchronous incremental redundancy (A-IR) with fixed transmission time intervals TTI for HSPA." IEEE, pp. 10-83-1087.
3GPP TS 33.220 V.1.1.0 XX,XX, "3rd Generation Partnership Projects; Technical Specification Group Services and System Aspects; Generic Authentication Architecture (GAA); Generic Bootstrapping Architecture (Release 6)" Feb. 9, 2004, pp. 1-17, figure 4, XP002996023.
3rd Generation Partnership Project; Technical Specification Group Radio Access Network; Physical Layer Aspects for Evolved UTRA (Release 7), 3GPP TR 25.814 v0.3.1 (Nov. 2005).
B. Sklar: "The process of thus correcting the channel-induced distortion is called equalization", Digital Communications, PTR Prentice Hall, Upper Saddle River, New Jersey, 1998, Formatting and Baseband Transmission, Chap. 2, Section 2.11.2, pp. 104-105.
Bahai, Saltzberg: "System Architecture," Multi-Carrier Digital Communications, Kluwer Academic, New York, NY, XP-002199501, 1999, pp. 17-21.
Bingham: "Other Types of MCM," ADSL, VDSL, and Multicarrier Modulation, John wiley & Sons, New York, XP-002199502. 2000, pp. 111-113.
Carl R. Nassar, Balasubramaniam Natarajan and Steve Shattil: Introduction of Carrier Interference to Spread Spectrum Multiple Access, Apr. 1999, IEEE, pp. 1-5.
Chennakeshu, et al. "A Comparison of Diversity Schemes for a Mixed-Mode Slow Frequency-Hopped Cellular System," IEEE, 1993, pp. 1749-1753.
Chennakeshu, et al. "Capacity Analysis of a TDMA-Based Slow-Frequency-Hopped Cellular System," IEEE Transaction on Vehicular Technology, vol. 45., No. 3 Aug. 1996, pp. 531-542.
Chiani, et al. "Outage Evaluation for Slow Frequency-Hopping Mobile Radio Systems" IEEE Transactions on Communications, vol. 47, No. 12, pp. 1865-1874, Dec. 1999.
Choi, et al., "Design of the Optimum Pilot Pattern for Channel Estimation in OFDM Systems," Global Telecommunications Conference, IEEE Communications Society, Globecom, Dallas, Texas (2004), pp. 3661-3665.
Czylwik: "Comparison Between Adaptive OFDM and Single Carrier Modulation with Frequency Domain Equalization," IEEE 47th Vehicular Technology Conference, vol. 2, May 4-7, 1997, pp. 865-869.
Das, et al. "On the Reverse Link Interference Structure for Next Generation Cellular Systems," European Microwave Conference, Oct. 11, 2004, pp. 3068-3072.
Dinis, et al., "A Multiple Access Scheme for the Uplink of Broadband Wireless Systems," IEEE Global Telecommunications Conference, 2004, GLOBECOM '04, vol. 6, Nov. 29 Dec. 3, 2004, pp. 3808-3812.
Fuchs, et al., "A Novel Tree-Based Scheduling Algorithm for the Downlink of Multi-User MIMO Systems with ZF Beamforming," IEEE International Conference on Acoustics, Speech, and Signal Processing, 2005, Proceedings, Philadelphia, PA, pp. 1121-1124.
Hermann Rohling et al., : "Performance Comparison of Different Multiple Access Schemes for the Downlink of an OFDM Communication System", Vehicular Technology Conference, 1997, 47th IEEE, vol. 3, May 4-7, 1997, pp. 1365-1369.
Hill, et al., "Cyclic Shifting and Time Inversion of Partial Transmit Sequences to Reduce the Peak-to-Average Power Ratio in OFDM," IEEE International Symposium on Personal, Indoor and Mobile Radio Communications, vol. 2, Sep. 18, 2000, Piscataway, NJ, pp. 1256-1259.
J.S. Chow and J.M. Cioffi: "A cost-effective maximum likelihood reciever for multicarrier systems", Proc. IEEE Int. Conf. On Comm., pp. 948-952, Jun. 1992.
Je, et al. "A Novel Multiple Access Scheme for Uplink Cellular Systems," IEEE Vehicular Technology Conference, Sep. 26, 2004 pp. 984-988.

John B. Groe, Lawrence E. Larson, "CDMA Mobile Radio Design" Sep. 26, 2001, Artech House, Norwood, MA02062 580530, XP002397967, pp. 157-159.
Kaleh: "Channel Equalization for Block Transmission Systems," IEEE Journal on Selected Areas in Communications, vol. 13, No. 1, Jan. 1995, pp. 110-121.
Kappes, J.M., and Sayegh, S.I., "Programmable Demultiplexer/Demodulator Processor," COMSAT Laboratories, IEEE, 1990, pp. 230-234.
Karsten Bruninghaus et al., : "Multi-Carrier Spread Spectrum and Its relationship to Single-Carrier Transmission", Vehicular technology Conference, 1998, VTC 98, 48th IEEE, vol. 3, May 18-21, 1998, pp. 2329-2332.
Keller, et al.: "Adaptive Multicarrier Modulation: A Convenient Framework for Time-Frequency Processing in Wireless Communications," Proceedings of the IEEE, vol. 88, No. 5, May 2000, pp. 611-640.
Kim, et al. "Performance of TDMA System With SFH and 2-Bit Differentially Detected GMSK Over Rayleigh Fading Channel," IEEE Vehicular Technology Conference, Apr. 28, 1996, pp. 789-793.
Kishiyama Y et al: "Investigation of Optimum Pilot Channel Structure for VSF-OFCDM Broadband Wireless Access in Forward Link", IEEE Vehicular Technology Conference, New York, NY, US, vol. 4, Apr. 22, 2003, pp. 139-144.
Kostic, et al. "Dynamic Frequency Hopping in Wireless Cellular Systems-Simulations of Full-Replacement and Reduced-Overhead Methods," IEEE Vehicular Technology Conference, May 16, 1999, pp. 914-918.
Kostic, et al. "Fundamentals of Dynamic Frequency Hopping in Cellular Systems," IEEE Journal on Selected Areas in Communications, vol. 19, No. 11, Nov. 2001, pp. 2254-2266.
Lacroix, et al.: "A Study of OFDM Parameters for High Data Rate Radio LAN's," 2000 IEEE 51st Vehicular Technology Conference Proceedings, vol. 2, May 15-18, 2000, pp. 1075-1079.
Leon, et al., "Cyclic Delay Diversity for Single Carrier-Cyclic Prefix Systems," Conference Record of the Thirty-Ninth Asilomar Conference on Signals, Systems and Computers, Oct. 28, 2005, Piscataway, NJ, pp. 519-523.
Lott: "Comparison of Frequency and Time Domain Differential Modulation in an OFDM System for Wireless ATM," 1999 IEEE 49th Vehicular Technology Conference, vol. 2, Jul. 1999, pp. 877-883.
Mignone, et al.: "CD3-OFDM: A New Channel Estimation Method to Improve the Spectrum Efficiency in Digital Terrestrial Television Systems," International Broadcasting Convention, Sep. 14-18, 1995 Conference Publication No. 413, IEE 1995, pp. 122-128.
Naofal Al-Dhahir: "A Bandwidth-Optimized Reduced-Complexity Equalized Multicarrier Transceiver", IEEE Transactions on Communications, vol. 45, No. 8, Aug. 1997.
Naofal Al-Dhahir: "Optimum Finite-Length Equalization for Multicarrier Transceivers", IEEE Trans. On Comm., pp. 56-64, Jan. 1996.
Nassar, Carl R., et al., "High-Performance MC-CDMA via Carrier Interferometry Codes", IEEE Transactions on Vehicular Technology, vol. 50, No. 6, Nov. 2001.
Net Working Group, T. Dierks, C. Allen, Certicom; The TLS Protocol Version 1.0; Jan. 1999.
NTT DoCoMo, et al.: "Orthogonal Common Pilot Channel and Scrambling Code in Evolved UTRA Downlink," 3GPP TSG RAN WG1 #42 on LTE, pp. 1-8 (Aug.-Sep. 2005).
Sari, et al., "Transmission Techniques for Digital Terrestrial TV Broadcasting," IEEE Communications Magazine, Feb. 1995, pp. 100-109.
Schnell, et al, "Application of IFDMA to Mobile Radio Transmission," IEEE 1998 International Conference on Universal Personal Communications, vol. 2, Oct. 5-9, 1998, pp. 1267-1272.
Schnell, et al., "A Promising New Wideband Multiple-Access Scheme for Future Mobile Communications Systems," European Transactions on Telecommunications, Wiley & Sons, Chichester, GB, vol. 10, No. 4, Jul. 1999, pp. 417-427.
Shattil et al., "Array Control Systems for Multicarrier Protocols Using a Frequency-Shifted Feedback Cavity", IEEE, 1999.
Sklar: "Formatting and Baseband Transmission", Chapter 2, pp. 54, 104-106.

Sorger U. et al., : "Interleave FDMA-a new spread-spectrum multiple-access scheme", IEEE Int. Conference on Atlanta, GA, USA Jun. 7-11, 1998, XP010284733.
Tellado, "Multicarrier Modulation with Low Par," Kluwer Academic, Dordrecht, NL, XP-002199500, 2000, pp. 6-11 and 55-60.
Tellambura, "Use of m-sequences for OFDM Peak-to-Average Power Ratio Reduction," Electronics Letters, vol. 33, No. 15, Jul. 17, 1997, pp. 1300-1301.
TIA/EIA/IS-2000 "Standards for CDMA2000 Spread Spectrum Systems" Version 1.0 Jul. 1999.
TIA/EIA/IS-95 "Mobile Station-Base Station Compatibility Standard for Dual-Mode Wideband Spread Spectrum Cellular System" Jul. 1993.
Torrieri, "Cellular Frequency-Hopping CDMA Systems," IEEE Vehicular Technology Conference, May 16, 1999, pp. 919-925.
Xiaodong, et al., "M-Sequences for OFDM Peak-to-Average Power Ratio Reduction and Error Correction," Electronics Letters, vol. 33, Issue 7, Mar. 27, 1997, pp. 554-555.
Zekri, et al., "DMT Signals with Low Peak-to-Average Power Ratio," Proceedings, IEEE International Symposium on Computers and Communications, 1999, Jul. 6-8, 1999, pp. 362-368.
A. Gorokhov. "CDM/TDM control channel," Aug. 2004.
A. Khandekar. "Packet Format Concept Review," Sep. 2004.
Blum, R. et al: "On Optimum MIMO with Antenna Selection," IEEE International Conference on Communications: Conference Proceedings, vol. 1, Apr. 28, 2002, pp. 386-390.
Boutros et al., (U.S. 2005/0008091); Jan. 13,2005; Sphere Decoding Of Symbols Transmitted In A Telecommunication System.
Catreux, S. et al.: "Simulation results for an interference-limited multiple input multiple output cellular system," Global Telecommunications Conference, 2000. GLOBECOM '00. IEEE. Dec. 1, 2000. vol. 2, pp. 1094-1096, http://ieeexplore.ieee.org/iel5/7153/19260/00891306.pdf?tp=&isnumber=19260&arnumber=8913063&punumber=7153.
Chiani, et al. "Outage Evaluation For Slow Frequency-Hopping Mobile Radio Systems" IEEE Transactions On Communications, vol. 47, No. 12, Dec. 1999, pp. 1865-1874.
Chung, S. et al.: "Low complexity algorithm for rate and power quantization in extended V-Blast" VTC Fall 2001. IEEE 54th. Vehicular Technology Conference Proceedings. Atlantic City, NJ, Oct. 7-11, 2001, vol. 1 of 4, pp. 910-914, Conf. 54.
D. Gore. "MIMO Channel Estimation Concept Review," Sept 2004.
El Gamal, H. et al.: "Universal Space-Time Coding," IEEE Transactions on Information Theory, vol. 49, Issue 5, pp. 1097-1119, XP011074756, ISSN: 0018-9448, May 2003.
European Search Report—EP07025189, Search Authority—Munich Patent Office, Mar. 6, 2008.
European Search Report—EP08012608 Search Authority—Munich Patent Office, Sep. 3, 2008.
European Search Report—EP09169034—European Search Authority—Berlin—Oct. 20. 2009.
European Search Report—EP10008766, Search Authority—Berlin Patent Office, Oct. 28, 2010.
European Search Report—EP10008767, Search Authority—Berlin Patent Office, Sep. 9, 2010.
"European Search Report—EP10011743, Search Authority—Munich Patent Office, Dec. 20, 2010".
European Search Report—EP10012081, Search Authority—Munich Patent Office, Dec. 17, 2010.
European Search Report—EP10012082, Search Authority—Munich Patent Office, Dec. 20, 2010.
European Search Report—EP10012083, Search Authority—Munich Patent Office, Dec. 30, 2010.
Gallager, Robert "Information Theory and Reliable Communication" John Wiley and Sons, Inc. (1968).
Groe, J., et al., "CDMA Mobile Radio Design," Sep. 26, 2001, Artech House, Inc. Norwood, MA, pp. 257-259.
Guo, K. et al.: "Providing end-to-end QoS for multimedia applications in 3G wireless networks," Proceedings vol. 5242, SPIE ITCom 2003 Conf. Internet Multimedia Management Systems IV, Nov. 26, 2003, pp. 1-14, DOI: 10.1117/12.514061.
H. Sampath et al. "A Fourth Generation MIMO-OFDM Broadband Wireless System: Design, Performance and Field Trial Results", IEEE Communications Magazine, pp. 143-149, Sep. 2002.
Hochwald, B. et al., "Achieving near-capacity on a multiple-antenna channel," IEEE Transactions on Communications, IEEE Service Center, Piscataway, New Jersey, vol. 51, No. 3, pp. 389-399 (2003).
Hochwald et al., (U.S. 2003/0076890); Apr.24, 2003; Method and Apparatus for Detection and Decoding of Signals Received From a Linear Propagation Channel.
International Preliminary Exam Report—PCT/US01/028315, International Preliminary Examining Authority—US, Apr. 11, 2003.
International Preliminary Examination Report PCT/US01/028314, IPEA/US Apr. 23, 2003.
International Preliminary Report on Patentability—PCT/US06/009707—The International Bureau of WIPO—Geneva, Switzerland—Sep. 18, 2007.
International Preliminary Report on Patentability—PCT/US06/009708—The International Bureau of WIPO—Geneva, Switzerland—Sep. 18, 2007.
International Preliminary Report on Patentability—PCT/US06/009757, The International Bureau of WIPO—Geneva, Switzerland, Sep. 18, 2007.
International Preliminary Report on Patentability—PCT/US06/012229—International Bureau of WIPO—Geneva, Switzerland, Oct. 3, 2007.
International Preliminary Report on Patentability—PCT/US06/014878, The International Bureau of WIPO—Geneva, Switzerland, Oct. 23, 2007.
International Preliminary Report on Patentability—PCT/US06/014879, The International Bureau of WIPO—Geneva, Switzerland, Oct. 23, 2007.
International Preliminary Report on Patentability—PCT/US06/021211, International Bureau of WIPO—Geneva, Switzerland, Dec. 6, 2007.
International Preliminary Report on Patentability—PCT/US06/021379—The International Bureau of WIPO, Geneva, Switzerland—Dec. 6, 2007.
International Preliminary Report on Patentability—PCT/US06/023095—The International Bureau of WIPO, Geneva, Switzerland—Dec. 17, 2007.
International Preliminary Report on Patentability—PCT/US06/023514, International Bureau of WIPO, Dec. 17, 2007.
International Preliminary Report on Patentability—PCT/US06/032900—The International Bureau of WIPO, Geneva, Switzerland—Feb. 26, 2008.
International Preliminary Report on Patentability—PCT/US06/032901, The Internation Bureau of WIPO, Geneva, Switzerland—Feb. 26, 2008.
International Preliminary Report on Patentability—PCT/US06/033269—The International Bureau of WIPO, Geneva, Switzerland—Feb. 26, 2008.
International Preliminary Report on Patentability—PCT/US06/033801—International Bureau of WIPO, Geneva, Switzerland, Mar. 4, 2008.
International Preliminary Report on Patentability—PCT/US06/033937, The International Bureau of WIPO—Geneva, Switzerland, Mar. 4, 2008.
International Preliminary Report on Patentability—PCT/US06/060291, International Bureau of WIPO—Geneva, Switzerland , Apr. 29, 2008.
International Preliminary Report on Patentability—PCT/US06/060292, International Bureau of WIPO—Geneva, Switzerland, Apr. 29, 2008.
International Preliminary Report on Patentability—PCT/US06/060327, The International Bureau of WIPO—Geneva, Switzerland, Apr. 29, 2008.
International Preliminary Report on Patentability—PCT/US06/060328, The International Bureau of WIPO—Geneva, Switzerland—Apr. 29, 2008.
International Preliminary Report on Patentability—PCT/US06/060332, International Bureau of WIPO—Geneva, Switzerland, Apr. 29, 2008.

International Preliminary Report on Patentability—PCT/US06/060333—International Bureau of WIPO—Geneva, Switzerland, Apr. 29, 2008.
International Preliminary Report on Patentability—PCT/US06/060336—The International Bureau of WIPO—Geneva, Switzerland—Apr. 29, 2008.
International Preliminary Report on Patentability—PCT/US06/061061, The International Bureau of WIPO—Geneva, Switzerland, May 29, 2008.
International Preliminary Report on Patentability—PCT/US07/060195—International Bureau of WIPO, Geneva, Switzerland, Jul. 8, 2008.
International Preliminary Report on Patentability, PCT/US05/024614, IPEA, US—Oct. 27, 2006.
International Preliminary Report on Patentability—PCT/US06/008986, International Bureau of WIPO, Geneva Switzerland Sep. 12, 2007.
International Preliminary Report on Patentability—PCT/US06/008987, International Bureau of WIPO, Geneva Switzerland—Sep. 12, 2007.
International Preliminary Report on Patentability—PCT/US2006/010962, International Bureau of WIPO—Oct. 4, 2007.
International Preliminary Report on Patentability—PCT/US2006/060286, International Bureau of WIPO, Apr. 29, 2008.
International Preliminary Report on Patentability—PCT/US2006/060287, International Bureau of WIPO—Apr. 29, 2008.
International Search Report—PCT/US2001/028314, International Search Authority—European Patent Office, Jun. 5, 2002.
International Search Report—PCT/US01/028315, International Search Authority—European Patent Office, Jun. 21, 2002.
International Search Report—PCT/US06/014878, International Search Authority—European Patent Office, Aug. 25, 2006.
International Search Report—PCT/US06/021379—International Search Authority, European Patent Office—Oct. 15, 2006.
International Search Report—PCT/US06/023095—International Search Authority, European Patent Office—Oct. 10, 2006.
International Search Report—PCT/US06/023514, International Search Authority—ISA/US, Oct. 5, 2007.
International Search Report—PCT/US06/032860, International Search Authority—European Patent Office, Dec. 29, 2006.
International Search Report—PCT/US06/032900, International Search Authority—European Patent Office, May 3, 2007.
International Search Report—PCT/US06/060291, International Search Authority—European Patent Office—May 3, 2007.
International Search Report—PCT/US06/060327—International Search Authority, European Patent Office, Mar. 1, 2007.
International Search Report—PCT/US06/060333, International Search Authority—European Patent Office, Apr. 4, 2007.
International Search Report and Written Opinion—PCT/US06/003947, International Search Authority—European Patent Office, Jun. 12, 2006.
International Search Report and Written Opinion—PCT/US06/008986, International Search Authority—European Patent Office, Sep.1, 2006.
International Search Report and Written Opinion—PCT/US06/008987, International Search Authority—European Patent Office, Sep. 1, 2006.
International Search Report and Written Opinion—PCT/US06/009707, International Search Authority—European Patent Office, Aug. 16, 2006.
International Search Report and Written Opinion—PCT/US06/009708, International Search Authority—European Patent Office, Sep. 19, 2006.
International Search Report and Written Opinion—PCT/US06/009757, International Search Authority—European Patent Office, Jul. 26, 2006.
International Search Report and Written Opinion—PCT/US06/012229, International Search Authority—European Patent Office, Jul. 18, 2006.
International Search Report and Written Opinion—PCT/US06/014879, International Search Authority—European Patent Office, Jan. 15, 2007.
International Search Report and Written Opinion—PCT/US06/021211, International Search Authority—European Patent Office, Sep. 25, 2006.
International Search Report and Written Opinion—PCT/US06/023514, International Search Authority—European Patent Office, Oct. 5, 2007.
International Search Report and Written Opinion—PCT/US06/031147, International Search Authority—European Patent Office, Feb. 2, 2007.
International Search Report and Written Opinion—PCT/US06/032901, International Search Authority—European Patent Office, Mar. 23, 2007.
International Search Report and Written Opinion—PCT/US06/033269, International Search Authority—European Patent Office, Feb. 22, 2007.
International Search Report and Written Opinion—PCT/US06/033801, International Search Authority—European Patent Office, Feb. 21, 2007.
International Search Report and Written Opinion—PCT/US06/033937, International Search Authority—European Patent Office, Apr. 12, 2007.
International Search Report and Written Opinion—PCT/US06/060286, International Search Authority—European Patent Office, May 2, 2007.
International Search Report and Written Opinion—PCT/US06/060292, International Search Authority—European Patent Office, Apr. 20, 2007.
International Search Report and Written Opinion—PCT/US06/060328, International Search Authority—European Patent Office, Mar. 30, 2007.
International Search Report and Written Opinion—PCT/US06/060332, International Search Authority—European Patent Office, Apr. 19, 2007.
International Search Report and Written Opinion—PCT/US06/060336, International Search Authority—European Patent Office, Mar. 2, 2007.
International Search Report and Written Opinion—PCT/US06/061061, International Search Authority—European Patent Office, Feb. 20, 2008.
International Search Report and Written Opinion—PCT/US07/060195, International Search Authority—European Patent Office, Dec. 6, 2007.
International Search Report and Written Opinion—PCT/US07/086197, International Search Authority—European Patent Office, Jul. 21, 2008.
International Search Report and Written Opinion—PCT/US09/064871, International Searching Authority—European Patent Office, Feb. 17, 2010.
International Search Report, PCT/US05/024614, International Search Authority, European Patent Office—Oct. 20, 2005.
International Search Report—PCT/US2006/010962, International Search Authority—European Patent Office—Aug. 4, 2006.
International Search Report—PCT/US2006/060287, International Search Authority—European Patent Office—May 9, 2007.
Kiessling, M. et al., "Short-term and long-term diagonalization of correlated MIMO channels with adaptive modulation" IEEE International Symposium on Personal, Indoor and Mobile Radio Communications, vol. 2, Sep. 15, 2002, pp. 593-597.
Kousa, M. et al: "Adaptive Binary Coding For Diversity Communication Systems" IEEE International Conference on Personal Wireless Communications Proceedings, pp. 80-84, XP000992269, (1997).
Maniatis, I. et al., "Pilots for joint channel estimation in multi-user OFDM mobile radio systems," 2002 IEEE Seventh International Symposium on Spread Spectrum Techniques and Applications, Prague, Czech Republic, Sep. 2, 2002, pp. 44-48, XP010615562.
Nokia, "Uplink Considerations for UTRA LTE", 3GPP TSG RAN WG1#40bis, Beijing, CN, R1-050251, 3GPP, Apr. 4, 2005, pp. 1-9.
NTT DoCoMo, "Downlink Multiple Access Scheme for Evolved UTRA", 3GPP R1-050249, 3GPP, Apr. 4, 2005, pp. 1-8.
OFDMA Phase II High Level Design, Jan 2004.
Prasad, N. et al.: "Analysis of Decision Feedback Detection for MIMO Rayleigh Fading Channels and Optimum Allocation of Transmitter Powers and QAM Constellations," pp. 1-10, 39th Annual Conference on Comm. Control and Comput., Monticello, IL Oct. 2001.

QFORGE Phase III Design Review, Apr. 2004.

Qualcomm Europe, Description and link simulations of MIMO schemes for OFDMA based E-UTRA downlink evaluation, 3GPP TSG-RAN WG1 #42 R1-050903, 3GPP, Sep. 2, 2005.

Qualcomm Europe: "Description and link simulations for OFDMA based E-UTRA uplink" 3GPP Draft; R1-051100, 3rd Generation Partnership Project (3GPP), Mobile Competence Centre; Sophia-Antipolis Cedex, France, vol. RAN WG1, No. San Diego, USA; Oct. 4, 2005, pp. 1-10, XP050100715.

S. Nishimura et al., "Downlink Nullforming by a Receiving Antenna Selection for a MIMO/SDMA Channel", Technical Search Report of Electric Information Communication Academic Conference, Feb. 28, 2002, vol. 101, No. 683, pp. 17-22, RCS 2001-286.

Schnell, et al., "Application of IFDMA to Mobile Radio Transmission", IEEE 1998 International Conference on Universal Personal Communications, vol. 2, Oct. 5-9, 1998, pp. 1267-1272.

Sumii, Kenji, et al., "A Study on Computational Complexity Reduction of Iterative Decoding for Turbo-coded MIMO-SDM Using Sphere Decoding," Technical Report of IEICE. RCS, Nov. 9, 2010, vol. 104, No. 675, pp. 43-48.

T. Kadous "SIC/H-ARQ in MIMO systems," Oct 2003.

T. Suzuki, Rank prediction method in consideration of transmission diversity in a MIMO system, Technical study report of the Institute of Electronics, Information and Communication Engineers, Feb. 27, 2008, vol. 107, No. 518, pp. 281-286, RCS2007-233 (Mar. 2008).

Taiwan Search Report—TW095129021—TIPO—May 24, 2011.
Taiwanese Search report—095139878—TIPO—Nov. 8, 2010.
Taiwanese Search Report—095139893—TIPO—Dec. 30, 2010.
Taiwanese Search report—095139900—TIPO—Apr. 29, 2010.
Taiwanese Search report—095130842—TIPO—Jul. 30, 2010.
Taiwanese Search report —095142631—TIPO—Aug. 1, 2010.
Taiwanese Search report—096100636—TIPO—Aug. 4, 2010-08.

T.Kadous. "Implementation of Iterative Detection and Decoding in MIMO Systems," May 2003.

Tomcik, Jim: "QFDD Technology Overview Presentation," IEEE 802.20 Working Group on Mobile Broadband Wireless Access, [Online] Nov. 15, 2005, pp. 1-73, XP002467626.

Translation of Office Action in Chinese Application 2006800295980 corresponding to U.S. Appl. No. 11/260,895, citing CN1346221 and CN1383631 dated Feb. 16, 2011.

Translation of Office Action in Japan application 2008-538193 corresponding to U.S. Appl. No. 11/261,065, citing JP11196109, JP10322304 and JP09008725 dated Mar. 8, 2011.

Translation of Office Action in Korean application 10-2007-7031029 corresponding to U.S. Appl. No. 11/260,931, citing US20030202491 and KR20040063057 dated Jan. 28, 2011.

Translation of Office Action in Canadian application 2625987 corresponding to U.S. Appl. No. 11/261,065, citing CA2557369 dated Apr. 12, 2011.

Translation of Office Action in Chinese application 200680040236.1 corresponding to U.S. Appl. No. 11/261,065, citing US20040048609 and CN1402916 dated Feb. 18, 2011.

Translation of Office Action in Chinese application 200680048265.2 corresponding to U.S. Appl. No. 11/260,931, citing US6904097, WO2004095851, CN1344451 dated Jan. 26, 2011.

Translation of Office Action in Chinese application 200680048832.4 corresponding to U.S. Appl. No. 11/261,158, citing CN1132474 dated Dec. 31, 2010.

Translation of Office Action in Japanese Application 2008-514880 corresponding to U.S. Appl. No. 11/445,377, citing JP2007519281 and JP2006505172 dated Nov. 9, 2010.

Translation of Office Action in Japanese application 2008-528103 corresponding to U.S. Appl. No. 11/260,924, citing JP2005502218, JP2004534456, JP2003348047, JP2003199173, JP2004529524, JP11508417, JP2001238269, JP2005130491 and JP2003500909 dated Feb. 8, 2011.

Translation of Office Action in Japanese Application 2008-529216 corresponding to U.S. Appl. No. 11/261,159, citing GB2348776, WO2004098222, WO2005065062 and WO2004102815. Dated Jan. 11, 2011.

Translation of Office Action in Japanese application 2008-538181 corresponding to U.S. Appl. No. 11/511,735, citing WO04064295, JP2002515203, JP8288927, JP7336323 and JP200157545 dated Jan. 25, 2011.

Voltz, P. J.,"Characterization of the optimum transmitter correlation matrix for MIMO with antenna subset selection", IEEE Transactions on Communications, vol. 51, No. 11, pp. 1779-1782, (Nov. 1, 2003).

Wang et al., "Improving performance of multi-user OFDM systems using bit-wise interleaver" ELECTRONICS LETTERS IEE Stevenage, GB, vol. 37. No. 19, Sep. 13, 2001, pp. 1173-1174 XP006017222.

Widdup, B. et al., "A highly-parallel VLSI architecture for a list sphere detector," IEEE International Conference, Paris, France, vol. 5, pp. 2720-2725 (2004).

Wiesel, A. et al.: "Efficient implementation of sphere demodulation" Signal Processing Advances in Wireless Communications, 2003. SPAWC 2003. 4TH IEEE Workshop on Rome. Italy Jun. 15-18, 2003, Piscataway, NJ, USA, IEEE, US, Jun. 15, 2003, pp. 36-40, XP010713463.

Written Opinion—PCT/US05/046742—International Search Authority, European Patent Office—Apr. 24, 2006.

Written Opinion—PCT/US06/021379—International Search Authority, European Patent Office—Oct. 16, 2006.

Written Opinion—PCT/US06/023095—International Search Authority, European Patent Office—Oct. 10, 2006.

Written Opinion—PCT/US06/032900, International Search Authority—European Patent Office, May 3, 2007.

Written Opinion—PCT/US06/060291, International Search Authority—European Patent Office, May 3, 2007.

Written Opinion—PCT/US06/060327—International Search Authority, European Patent Office, Mar. 1, 2007.

Written Opinion—PCT/US06/060333, International Search Authority—European Patent Office, Apr. 4, 2007.

Written Opinion, PCT/US05/024614, International Search Authority, European Patent Office—Oct. 20, 2005.

Written Opinion PCT/US06/014879 International Search Authority European Patent Office Oct. 19, 2007.

Written Opinion—PCT/US2006/010962, International Search Authority—European Patent Office—Aug. 4, 2006.

Written Opinion—PCT/US2006/060287, International Search Authority—European Patent Office—Apr. 4, 2008.

Yee (US2005/0135498); Jun. 23, 2005; Signal Decoding Methods and Apparatus.

Yongmei Dai,; Sumei Sun; Zhongding Lei; Yuan Li.: "A List Sphere Decoder based turbo receiver for groupwise space time trellis coded (GSTTC) systems," 2004 IEEE 59th Vehicular Technology Conference, vol. 2, pp. 804-808, May 17, 2004, doi: 10.1109/VETECS. 2004.1388940.

Yun et al., "Performance Of an LDPC-Coded Frequency-Hopping QFDMA System Based on Resource Allocation in the Uplink" Vehicular Technology—Conference 2004. VTO 2004-Spring, 2004 IEEE 59th Milan, Italy May 17-19, 2004, Piscataway, NJ, USA, vol. 4, May 17, 2004. pp. 1925-1928. XP010766497.

* cited by examiner

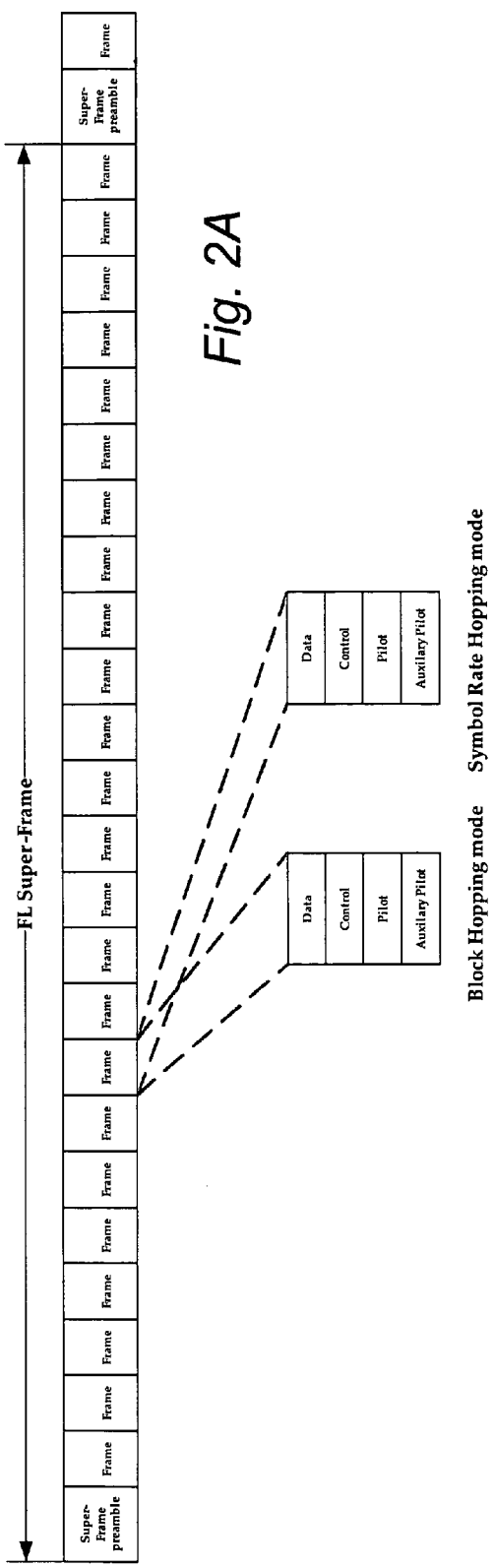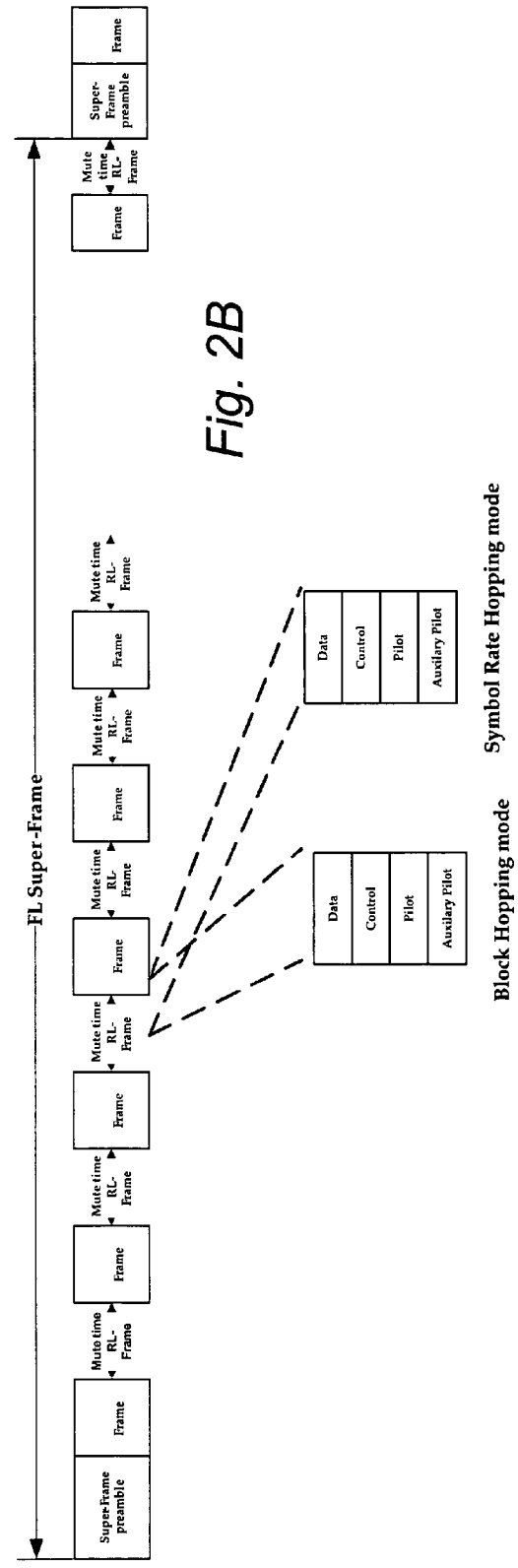

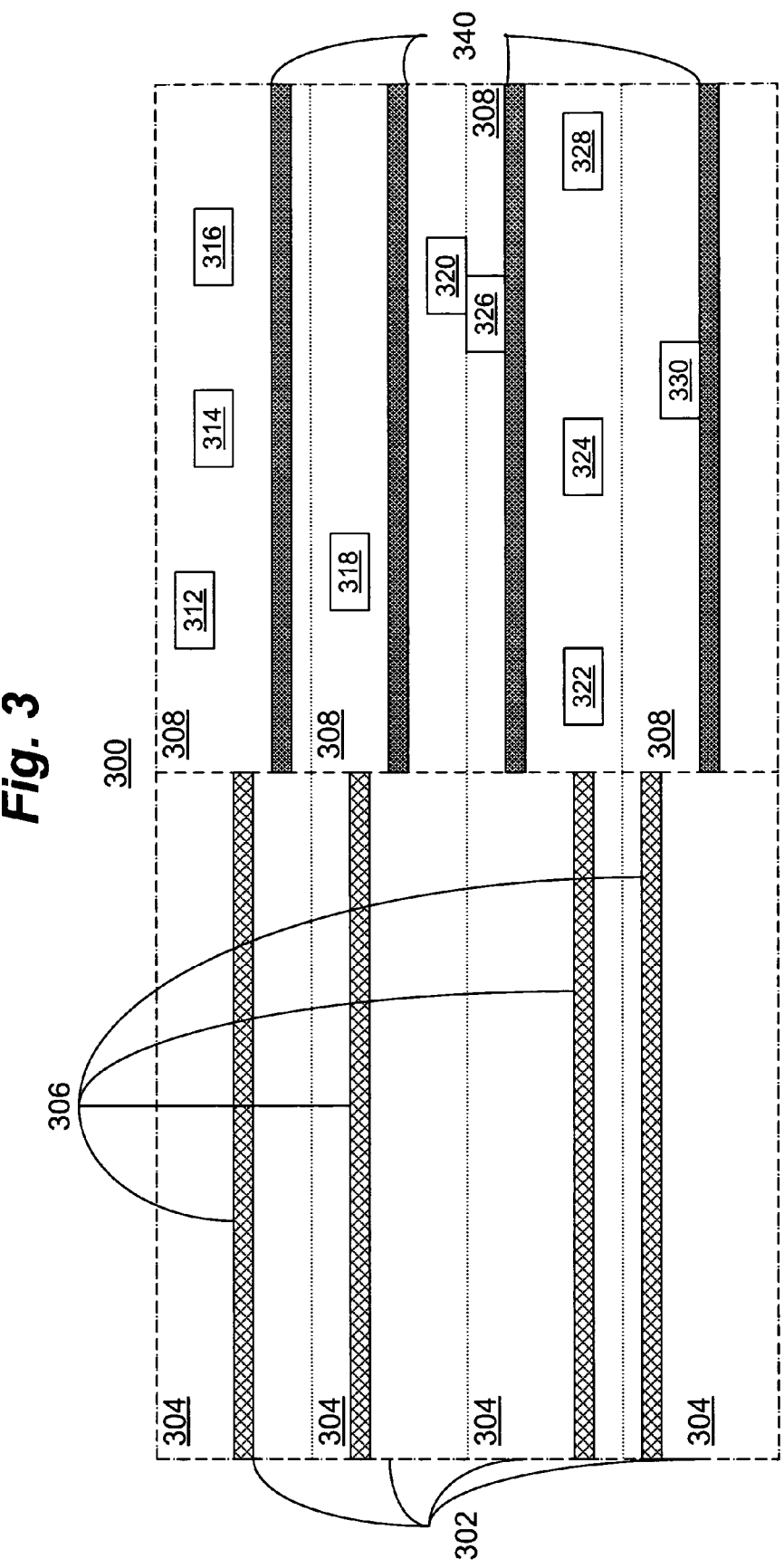

US 8,045,512 B2

SCALABLE FREQUENCY BAND OPERATION IN WIRELESS COMMUNICATION SYSTEMS

REFERENCE TO CO-PENDING APPLICATIONS FOR PATENT

The present Application for Patent is related to the following U.S. Patent Applications:
"A METHOD AND APPARATUS FOR BOOTSTRAPING INFORMATION IN A COMMUNICATION SYSTEM" Ser. No. 11/261,065, filed concurrently herewith, assigned to the assignee hereof, and expressly incorporated by reference herein; and
"Puncturing Signaling Channel For A Wireless Communication System" Ser. No. 11/260,931, filed concurrently herewith, assigned to the assignee hereof, and expressly incorporated by reference herein; and
"SYSTEMS AND METHODS FOR Control Channel Signaling" Ser. No. 11/261,836, filed concurrently herewith, assigned to the assignee hereof, and expressly incorporated by reference herein; and
"Varied Signaling Channels For A Reverse Link In A Wireless Communication System" Ser. No. 11/261,806, filed concurrently herewith, assigned to the assignee hereof, and expressly incorporated by reference herein; and
"Varied Transmission Time Intervals For Wireless Communication System" Ser. No. 11/260,932, filed concurrently herewith, assigned to the assignee hereof, and expressly incorporated by reference herein; and
"Channel Sensitive Scheduling" Ser. No. 11/260,924, filed concurrently herewith, assigned to the assignee hereof, and expressly incorporated by reference herein; and
"Method And Apparatus For Providing Antenna Diversity In A Wireless Communication System" Ser. No. 11/261,823, filed concurrently herewith, assigned to the assignee hereof, and expressly incorporated by reference herein; and
"Mobile Wireless Access System" 60/731,013, filed concurrently herewith, assigned to the assignee hereof, and expressly incorporated by reference herein; and
"Variable Shared Signaling Channel" Ser. No. 11/261,158, filed concurrently herewith, assigned to the assignee hereof, and expressly incorporated by reference herein.

BACKGROUND

I. Field

The present disclosure relates generally to wireless communications, and amongst other things to scalable frequency band operation.

II. Background

Wireless communication systems have become a prevalent means by which a majority of people worldwide have come to communicate. Wireless communication devices have become smaller and more powerful in order to meet consumer needs and to improve portability and convenience. The increase in processing power in mobile devices such as cellular telephones has lead to an increase in demands on wireless network transmission systems. Such systems typically are not as easily updated as the cellular devices that communicate there over. As mobile device capabilities expand, it can be difficult to maintain an older wireless network system in a manner that facilitates fully exploiting new and improved wireless device capabilities.

Wireless communication systems generally utilize different approaches to generate transmission resources in the form of channels. These systems may be code division multiplexing (CDM) systems, frequency division multiplexing (FDM) systems, and time division multiplexing (TDM) systems. One commonly utilized variant of FDM is orthogonal frequency division multiplexing (OFDM) that effectively partitions the overall system bandwidth into multiple orthogonal subcarriers. These subcarriers may also be referred to as tones, bins, and frequency channels. Each subcarrier can be modulated with data. With time division based techniques, a each subcarrier can comprise a portion of sequential time slices or time slots. Each user may be provided with a one or more time slot and subcarrier combinations for transmitting and receiving information in a defined burst period or frame. The hopping schemes may generally be a symbol rate hopping scheme or a block hopping scheme.

Code division based techniques typically transmit data over a number of frequencies available at any time in a range. In general, data is digitized and spread over available bandwidth, wherein multiple users can be overlaid on the channel and respective users can be assigned a unique sequence code. Users can transmit in the same wide-band chunk of spectrum, wherein each user's signal is spread over the entire bandwidth by its respective unique spreading code. This technique can provide for sharing, wherein one or more users can concurrently transmit and receive. Such sharing can be achieved through spread spectrum digital modulation, wherein a user's stream of bits is encoded and spread across a very wide channel in a pseudo-random fashion. The receiver is designed to recognize the associated unique sequence code and undo the randomization in order to collect the bits for a particular user in a coherent manner.

A typical wireless communication network (e.g., employing frequency, time, and/or code division techniques) includes one or more base stations that provide a coverage area and one or more mobile (e.g., wireless) terminals that can transmit and receive data within the coverage area. A typical base station can simultaneously transmit multiple data streams for broadcast, multicast, and/or unicast services, wherein a data stream is a stream of data that can be of independent reception interest to a mobile terminal. A mobile terminal within the coverage area of that base station can be interested in receiving one, more than one or all the data streams transmitted from the base station. Likewise, a mobile terminal can transmit data to the base station or another mobile terminal. In these systems the bandwidth and other system resources are assigned utilizing a scheduler.

For the case of large deployment bandwidths, it is desirable to support mobile stations that are not capable of demodulating the entire bandwidth or that can be made to demodulate less than the entire bandwidth.

SUMMARY

The following presents a simplified summary of one or more embodiments in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments in a simplified form as a prelude to the more detailed description that is presented later.

In an aspect, a wireless communication apparatus comprises a processor configured to instruct transmission of a plurality of control channel transmissions on each of a plurality of carriers. The control channel transmissions include sufficient information to communicate within the carrier without utilizing information contained in any other of the plurality of the control channels.

In another aspect, method comprises transmitting on a first carrier a control channel transmission and transmitting on second carrier another control channel transmission during a substantially same time frame as the control channel transmission. The control channel transmissions contain sufficient information to communicate within the carrier without utilizing information contained in any other of the plurality of the control channels.

Various means and computer readable media may be utilized to perform the above described methods and processor configured functions.

To the accomplishment of the foregoing and related ends, the one or more embodiments comprise the features hereinafter fully described and particularly pointed out in the claims. The following description and the annexed drawings set forth in detail certain illustrative aspects of the one or more embodiments. These aspects are indicative, however, of but a few of the various ways in which the principles of various embodiments may be employed and the described embodiments are intended to include all such aspects and their equivalents.

BRIEF DESCRIPTION OF THE DRAWINGS

FIGS. 2A and 2B illustrate aspects of superframe structures for a multiple access wireless communication system.

FIG. 3 illustrates aspects of multi-carrier frame structures for a multiple access wireless communication system.

DETAILED DESCRIPTION

Figure 1:
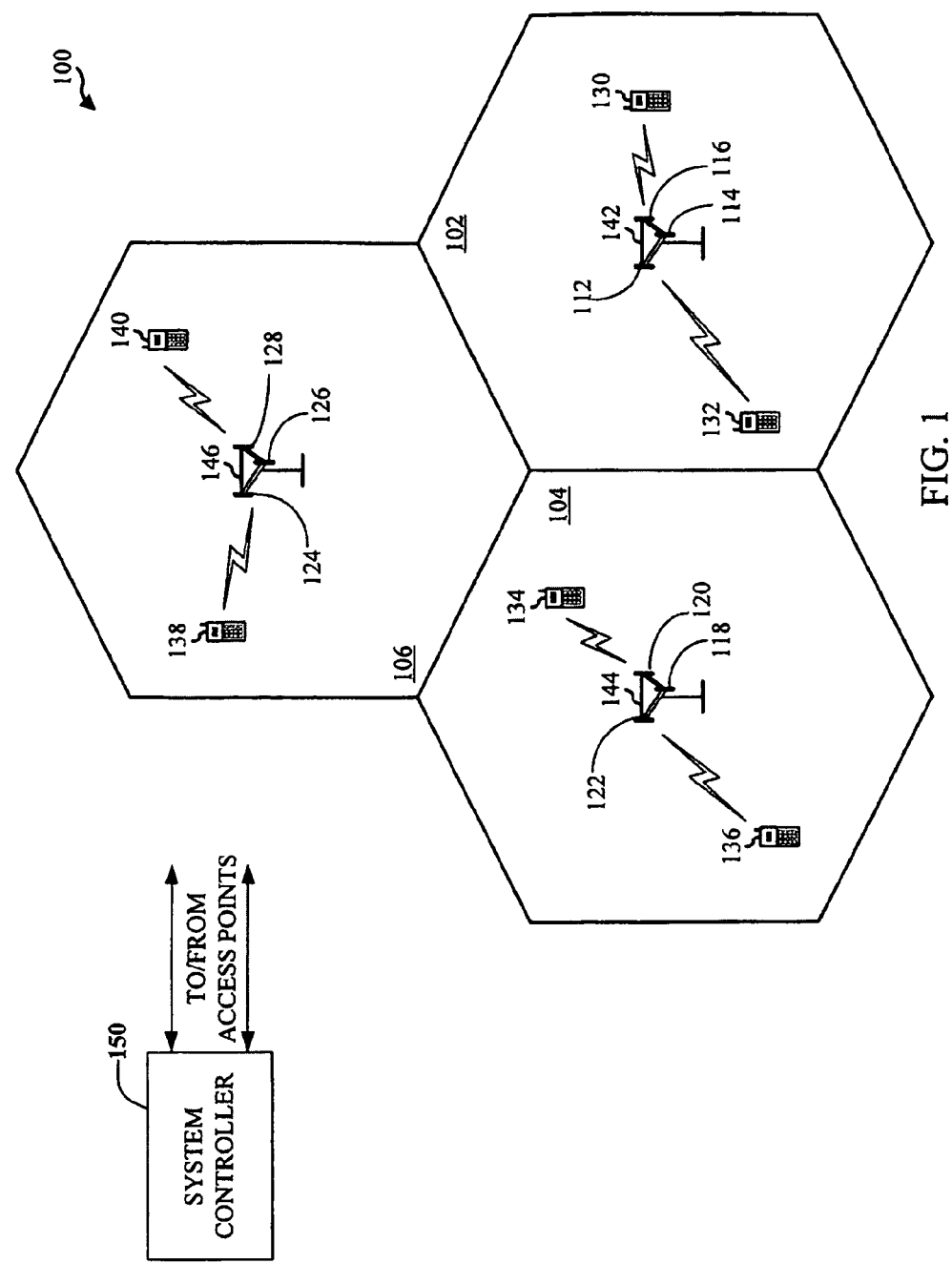
FIG. 1 illustrates aspects of a multiple access wireless communication system.

Various embodiments are now described with reference to the drawings, wherein like reference numerals are used to refer to like elements throughout. In the following description, for purposes of explanation, numerous specific details are set forth in order to provide a thorough understanding of one or more embodiments. It may be evident, however, that such embodiment(s) may be practiced without these specific details. In other instances, well-known structures and devices are shown in block diagram form in order to facilitate describing one or more embodiments.

Referring to FIG. 1, a multiple access wireless communication system according to one embodiment is illustrated. A multiple access wireless communication system 100 includes multiple cells, e.g. cells 102, 104, and 106. In the embodiment of FIG. 1, each cell 102, 104, and 106 may include an access point 142, 144, and 146 that includes multiple sectors. The multiple sectors are formed by groups of antennas each responsible for communication with access terminals in a portion of the cell. In cell 102, antenna groups 112, 114, and 116 each correspond to a different sector. In cell 104, antenna groups 118, 120, and 122 each correspond to a different sector. In cell 106, antenna groups 124, 126, and 128 each correspond to a different sector.

Each cell includes several access terminals which are in communication with one or more sectors of each access point. For example, access terminals 130 and 132 are in communication base 142, access terminals 134 and 136 are in communication with access point 144, and access terminals 138 and 140 are in communication with access point 146.

Controller 130 is coupled to each of the cells 102, 104, and 106. Controller 130 may contain one or more connections to multiple networks, e.g. the Internet, other packet based networks, or circuit switched voice networks that provide information to, and from, the access terminals in communication with the cells of the multiple access wireless communication system 100. The controller 130 includes, or is coupled with, a scheduler that schedules transmission from and to access terminals. In other embodiments, the scheduler may reside in each individual cell, each sector of a cell, or a combination thereof.

Each of the sectors can operate utilizing one or more of a plurality of carriers. Each carrier is a portion of a larger bandwidth in which the system can operate, or is available for communication. A single sector utilizing one or more carriers may have multiple access terminals scheduled on each of the different carriers during any given time interval, e.g. frame or superframe. Further, one or more access terminals may be scheduled on multiple carriers simultaneously.

An access terminal may be scheduled in one carrier or more than one carrier according to its capabilities. These capabilities may be part of the session information that is generated when the access terminal attempts to acquire communication or that has been negotiated previously, may be part of the identification information that is transmitted by the access terminal, or be established according to any other approach. In certain aspects, the session information may comprise a session identification token that is generated by querying the access terminal or determining its capabilities through its transmissions.

As used herein, an access point may be a fixed station used for communicating with the terminals and may also be referred to as, and include some or all the functionality of, a base station, a Node B, or some other terminology. An access terminal may also be referred to as, and include some or all the functionality of, a user equipment (UE), a wireless communication device, terminal, a mobile station or some other terminology.

It should be noted that while FIG. 1, depicts physical sectors, i.e. having different antenna groups for different sectors, other approaches may be utilized. For example, utilizing multiple fixed "beams" that each cover different areas of the cell in frequency space may be utilized in lieu of, or in combination with physical sectors. Such an approach is depicted and disclosed in copending U.S. patent application Ser. No._____, entitled "Adaptive Sectorization In Cellular System," and filed on even date herewith.

Referring to FIGS. 2A and 2B, aspects of superframe structures for a multiple access wireless communication system are illustrated. FIG. 2A illustrates aspects of superframe structures for a frequency division duplexed (FDD) multiple access wireless communication system, while FIG. 2B illustrates aspects of superframe structures for a time division duplexed (TDD) multiple access wireless communication system. The superframe preamble may be transmitted separately for each carrier or may span all of the carriers of the sector.

In both FIGS. 2A and 2B, the forward link transmission is divided into units of superframes. A superframe may consist of a superframe preamble followed by a series of frames. In an FDD system, the reverse link and the forward link transmission may occupy different frequency bandwidths so that transmissions on the links do not, or for the most part do not, overlap on any frequency subcarriers. In a TDD system, N forward link frames and M reverse link frames define the number of sequential forward link and reverse link frames that may be continuously transmitted prior to allowing transmission of the opposite type of frame. It should be noted that the number of N and M may be vary within a given superframe or between superframes.

In both FDD and TDD systems each superframe may comprise a superframe preamble. In certain embodiments, the superframe preamble includes a pilot channel that includes pilots that may be used for channel estimation by access terminals, a broadcast channel that includes configuration information that the access terminal may utilize to demodulate the information contained in the forward link frame. Further acquisition information such as timing and other information sufficient for an access terminal to communicate on one of the carriers and basic power control or offset information may also be included in the superframe preamble. In other cases, only some of the above and/or other information may be included in this superframe preamble.

As shown in FIGS. 2A and 2B, the superframe preamble is followed by a sequence of frames. Each frame may consist of a same or a different number of OFDM symbols, which may constitute a number of subcarriers that may simultaneously utilized for transmission over some defined period. Further, each frame may operate according to a symbol rate hopping mode, where one or more non-contiguous OFDM symbols are assigned to a user on a forward link or reverse link, or a block hopping mode, where users hop within a block of OFDM symbols. The actual blocks or OFDM symbols may or may not hop between frames.

Referring to FIG. 3, aspects of a channel structure for a multiple access wireless communication system are illustrated. A bandwidth 300 is available for communication according to system design parameters. The bandwidth 300 comprises a number of carriers 302. Each carrier includes one or more forward link frames 304 and reverse link frames 308, each of which may be part of one or more superframes as discussed with respect to FIG. 2.

Each forward link frame 304 of each carrier 302 includes control channels 306. Each of the control channels 306 may include information for functions related to, for example, acquisition; acknowledgements; forward link assignments for each access terminal, which may be different or the same for broadcast, multicast, and unicast message types, reverse link assignments for each access terminal; reverse link power control for each access terminal; and reverse link acknowledgements. It should be noted that more or fewer of such functions may be supported in control channels 306 of one or all of the carriers. Also, the control channels 306 may hop in each frame according to hopping sequences that are the same or different from hopping sequences assigned to data channels.

Each reverse link frame 308 includes a number of reverse link transmissions, e.g. 312, 314, 316, 318, 320, 322, 324, 326, 328, and 330, from access terminals. In FIG. 3, each reverse link transmission is depicted as being a block, i.e. a group of contiguous OFDM symbols. It should be noted that symbol rate hopping, e.g. non contiguous symbol blocks may also be utilized.

In addition, each reverse link frame 308 may include one more reverse link control channels 340, which may include feedback channels; pilot channels for reverse link channel estimation, and acknowledgment channels that may be included in the reverse link transmissions 312-330. Each of the reverse link control channels 340 may include information for functions related to, for example, forward link and reverse link resource requests by each access terminal; channel information, e.g. channel quality information (CQI) for different types of transmission; and pilots from the access terminals that may be used by the access point for channel estimation purposes. It should be noted that more or fewer of such functions may be supported in control channels 340 of one or all of the carriers. Also, the reverse link control channels 340 may hop in each frame according to hopping sequences that are the same or different from hopping sequences assigned to data channels.

In certain aspects, to multiplex users on the reverse link control channels 340 one or more orthogonal codes, scrambling sequences, or the like may be utilized to separate each user and/or different types of information transmitted in the reverse link control channels 340. These orthogonal codes may be user specific or may be allocated by the access point to each access terminal per communication session or shorter period, e.g. per superframe.

In some aspects, some users are assigned to a single carrier so that all of their forward link transmissions for a superframe or multiple frames of a superframe are assigned to the same carrier. That way an access terminal that is capable of only demodulating a portion of bandwidth at any given time may monitor only a subset of the bandwidth 300, e.g. one carrier 302 or any number of carrier less than all of the channels. To support such a structure, each of the forward link control channels 306 and reverse link control channels 340, for a given carrier, needs to contain sufficient information so that an access terminal operating on that carrier 302 may be supported by the channels provided in the superframe preamble and forward link control channels 306 and reverse link control channels 340 of the specific carrier without reference to information contained in the other carrier. This may be provided by including equivalent channels information in the forward link control channels 306 and reverse link control channels 340 of each carrier 302.

In certain aspects, acquisition, assignment, access, request, power control, pilot and reporting channels exist in each of the carriers 302 in the superframe preamble and forward link control channels 306 and reverse link control channels 340. However, the actual encoding, transmission rates, message types and timing, resource allocations, overhead messaging, hop patterns and/or sequences, and other transmission and location parameters may vary from carrier to carrier. The format, transmission rate and hopping information may be signaled or otherwise available to an access terminal. This information may be available via separate control channels not associated with a specific carrier or may be provided via other means.

Some terminals, having a greater capability to demodulate signals, may be scheduled on two or more carriers within a superframe, in consecutive superframes, or during its communication session. These multi-carrier access terminals may be able to utilize different carriers for reverse link frames and forward link frames during a communication session or superframe, may be scheduled on different carriers in different superframes or during the communication session, or may be scheduled over frames that are substantially synchronous in time on different carriers. Such multi-carrier access terminals may be scheduled to provide load balancing of resources for a given carrier and provide statistical multiplexing gains through out the total bandwidth.

In order to support multi-carrier access terminals operating across several carriers 302 within a superframe, in consecutive superframes, or during its communication session several approaches may be provided. Firstly, the multi-carrier access terminals may demodulate the superframe preambles and forward link control channels 306 for each of the carriers individually. In such a case, all assignments, scheduling, power control and the like would be performed on a carrier by carrier basis.

Alternatively, a separate control channel may contain the operating parameters of the different carriers, so that an access terminal may obtain some or all of the information described above with respect to the superframe preamble and forward link control channels 306 and reverse link control channels 340 for one or more carriers via that control channel. Also, this additional control channel may include information as to how to demodulate and decode the different superframe preamble and forward link control channels 306 and reverse link control channels 340 for one or more of the carriers. This would allow a user being able to decode the superframe preamble and forward link control channels 306 and reverse link control channels 340 of each carrier at any time.

Further, in some aspects all information for all, or groups, of the carriers may be maintained in the superframe preamble and forward link control channels 306 and reverse link control channels 340 of a single one of the carriers. In such a case, an access terminal capable of utilizing multiple-carriers in a communication session may tune to receive control information in a single carrier and transmit its control information in a single carrier. These carriers need not be the same. The carriers utilized for this functionality may vary over time according to a predetermined sequence or some other means.

In addition, for the purposes of scheduling, an assignment may constitute multiple assignments from different carriers. That is, an access terminal may receive individual assignments on each carrier and then combine those assignments to determine its assignment for frames that may or may not overlap, fully or partially, in terms of time for both the forward and reverse links.

In certain aspects, each carrier comprises 5 MHz of a 20 MHz bandwidth, with carrier comprising 512 subcarriers. However, other sizes of bandwidth, subcarriers, and carriers may be utilized. Further, the number of subcarriers allocated to each carrier may vary, so that the number of subcarriers in each carrier may be different from each other carrier or one carrier may have more subcarriers than the other carriers. Also, it should be noted that one or more carriers may be asynchronous with respect to each other, e.g. having different start and end times for their forward link frame and/or reverse link frame. Signaling or assignment messages, in the control channel 306 or superframe preamble may communicate the timing information in such cases for that carrier.

Additionally, in certain aspects, some of the available subcarriers in an OFDM symbol in a carrier may be designated as guard subcarriers and may not be modulated, i.e., no energy is transmitted on these subcarriers. The number of guard subcarriers in the superframe preamble and in each frame may be provided via one or more messages in the control channels 306 or superframe preamble.

Further, in some aspects, in order to reduce overhead transmission to a particular multi-carrier terminal, a packet may be jointly encoded for that access terminal, even if the symbols of the packets are to be transmitted over subcarriers of different carriers. In this way a single cyclic redundancy check may be utilized for the packet and the transmissions on some carriers that include symbols from these packets are not subject to overhead transmissions of cyclic redundancy checks. Alternatively, the access point may modulate its packets on a per carrier basis, i.e. only those symbols to be transmitted on a same carrier being included in a same packet. Further, it may lump certain carriers together for the purposes of packet modulation, e.g. only modulate symbols from the top two carriers together in a single packet.

It should be noted that a scheduler for each of the carriers may utilize the same or different approach to hopping, e.g. using different channel trees or hop permutations, for each carrier. Further, each carrier may be scheduled according to the same or different techniques and algorithms. For example, each carrier may include channel trees and structures as described in co-pending U.S. patent application Ser. No._____, filed on even date herewith which is incorporated herein by reference in its entirety.

Figure 4A:
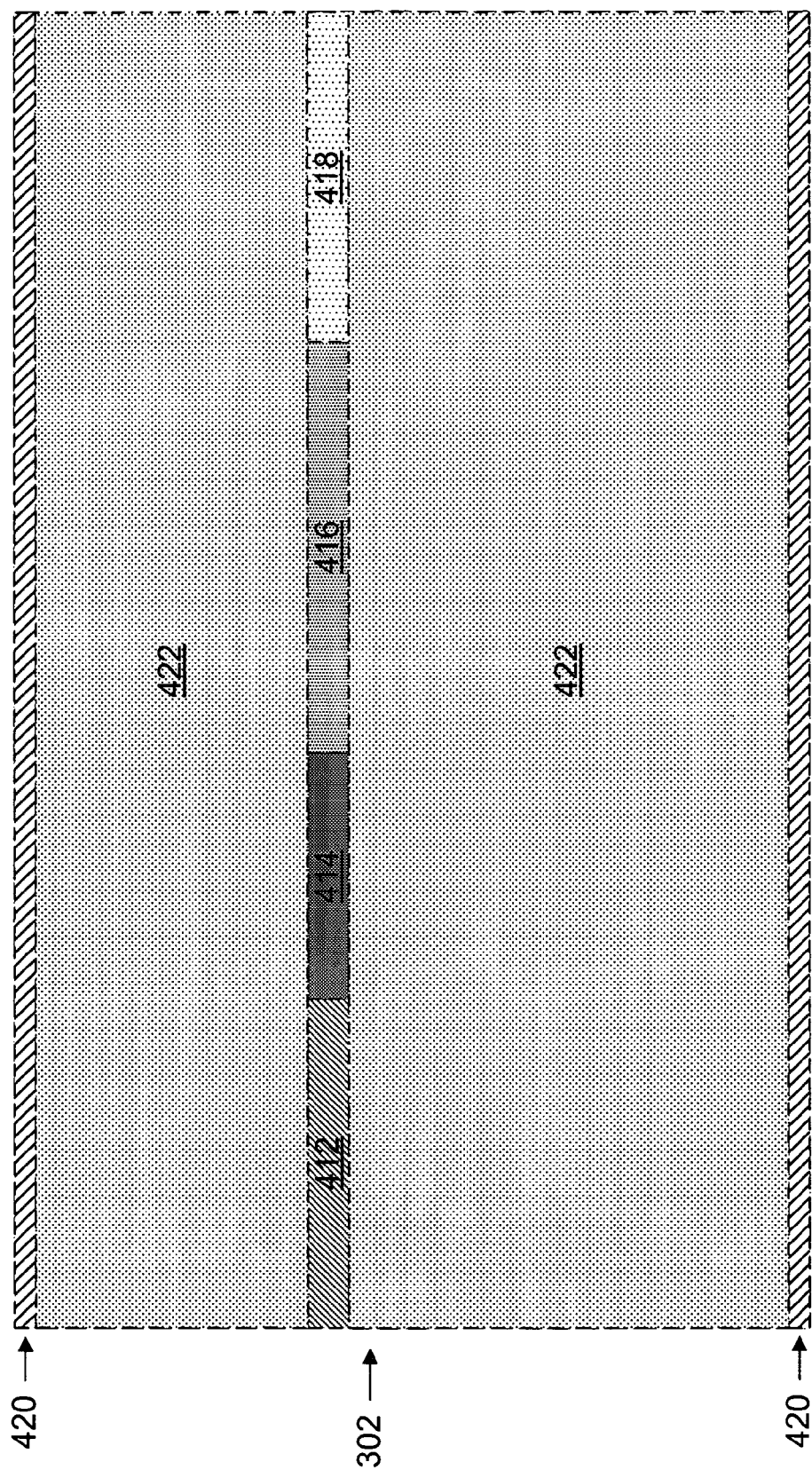
FIG. 4A illustrates aspects of a forward link frame of a carrier for a multiple access wireless communication system.

Referring to FIG. 4A, aspects of a forward link frame of a carrier for a multiple access wireless communication system are illustrated. As shown in FIG. 4A, each forward link frame 304 is further divided into two segments. The first, a control channel 306, which may or may not comprises a contiguous group of subcarriers, has a variable number of subcarriers assigned depending on the desired amount of control data and other considerations. The remaining portions 410 are generally available for data transmission. Control channel 306 may include one or more pilot channels 412 and 414. In symbol rate hopping mode, the pilot channels may be present on all of the OFDM symbols in each forward link frame, and need not be included in the control channel 306 in those instances. In both cases, the a signaling channel 416 and the power control channel 418 may be present in the control channel 306, as depicted in FIG. 4A. The signaling channel 416 may include assignment, acknowledgement, and/or power references and adjustments for data, control, and pilot transmissions on the reverse link.

Power control channel 418 may carry information regarding interference generated at other sectors due transmissions from access terminals of that sector. In certain aspects, power control channel 418 may be present on only a single carrier, where all single carrier access terminals are scheduled on that carrier while multi-carrier access terminals tune to that carrier for the power control channel 418. In such a case, a single power reference may be utilized. Also, in such an aspect, it is possible that multi-carrier access terminals may hop their reverse link control channel between different frames over time and do not simply transmit reverse link control channel(s) in the same frame(s) as its reverse link data transmissions. In this case, for multi-carrier access terminals, a single reference may be utilized to adjust their transmission power across all of the carriers allowing for a same power control over all of the carriers for reverse link transmissions by the multi-carrier access terminals.

Alternatively, a multi-carrier access terminal may need to have multiple power control loops, one for each carrier or a group of carriers having a common power control channel 418. In this case, transmission on the single carrier or grouped carriers would be done on an individual basis and different power references and back-offs may be utilized per carrier.

Also, in certain aspects, the subcarriers 420 at the edge of each carrier 302, but often not at the edge of the entire bandwidth, may function as quasi-guard subcarriers. In certain aspects, on the reverse link, these subcarriers 420 are not modulated by access terminals that are capable of demodulating only one carrier, but may be modulated, on the reverse link, by access terminals that are capable of demodulating multiple carriers, which adds additional bandwidth for transmission to those access terminals.

On the forward link, in certain aspects, the quasi-guard subcarriers 420 are generally not modulated so long as there are some access terminals in the sector which are not capable of demodulating more than one carrier. Therefore, in certain aspects, there may be overhead signaling whether these subcarriers 420 are to be modulated. Further, the quasi-guard subcarriers 420 may or may not be modulated in the superframe preamble for the carrier, e.g. they the are not modulated where multiple carriers are utilized by any single user in the system.

It should be noted that where multiple transmit antennas may be used to transmit for a sector, the different transmit antennas should have the same superframe timing (including the superframe index), OFDM symbol characteristics, and hop sequences.

Figure 4B:
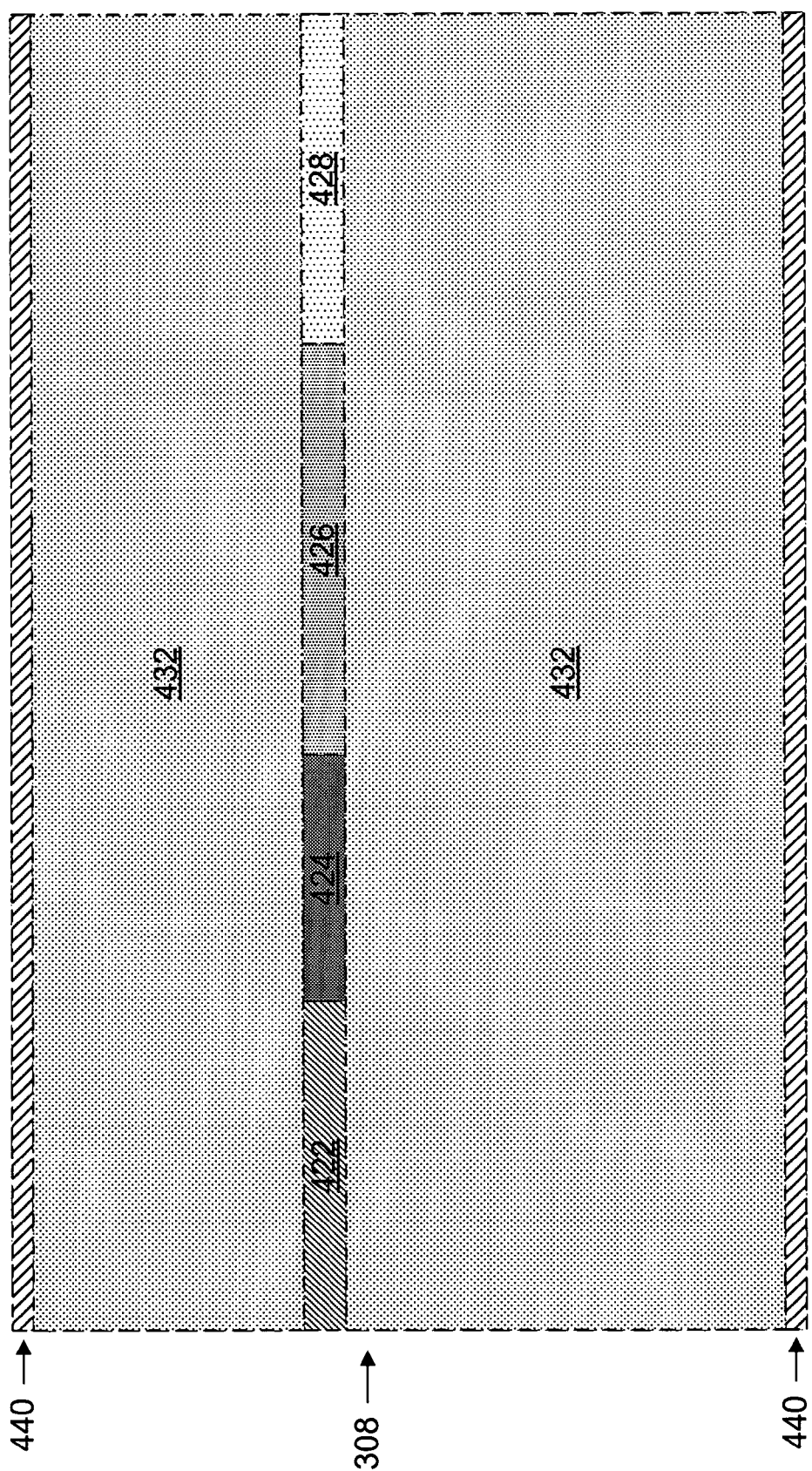
FIG. 4B illustrates aspects of a reverse link frame of a carrier for a multiple access wireless communication system

Referring to FIG. 4B, aspects of a reverse link frame of a carrier for a multiple access wireless communication system are illustrated. A pilot channel 422 may include pilots to allow the access point to estimate the reverse link. A request channel 424 may include information to allow an access terminal to request resources for following reverse link, and forward link, frames. In some aspects, a multi-carrier terminal may transmit on the request channel 424 in only one of the carriers 302. Also, the request channel messages may be repeated on all of the carriers on which the access terminal may operate during each frame.

A reverse link feedback channel 426 allows access terminals to provide feedback with respect to channel information CQI. The CQI may relate to one or more scheduled modes, or available modes for scheduling, for transmission to the access terminal. Exemplary modes may include beamforming, SDMA, preceding, or combinations thereof. A power control channel 428 may be used as a reference to allow the access point to generate power control instructions for reverse link transmission, e.g. data transmissions, by the access terminal. In some aspects, the power control channel 428 may comprise one or more of the feedback channels 426.

Data channels 432 may operate according to a symbol rate hopping or block hopping mode in different reverse link frames 408. Also, quasi-guard subcarriers 440 may be modulated, or not modulated, in according to the same rules described with respect to quasi-guard subcarriers 420 discussed with respect to FIG. 4A.

It should be noted that while FIGS. 4A and 4B depict different channels that make up control channels 306 and 340 as being multiplexed in time, this need not be the case. The different channels that make up control channels 306 and 340 may multiplexed using different orthogonal, quasi-orthogonal, or scrambling codes, different frequencies, or any combinations of time, code, and frequency.

While the discussion with respect to FIGS. 2A, 2B, 3, 4A, and 4B include information regarding a superframe preamble, a superframe preamble need not be utilized. An alternative approach may include to utilizing frames with preambles that have equivalent information. Also, a broadcast control channel may be utilized to contain some or all of the information of the superframe preamble, with other information contained in a preamble or control channel of a frame.

Figure 5:
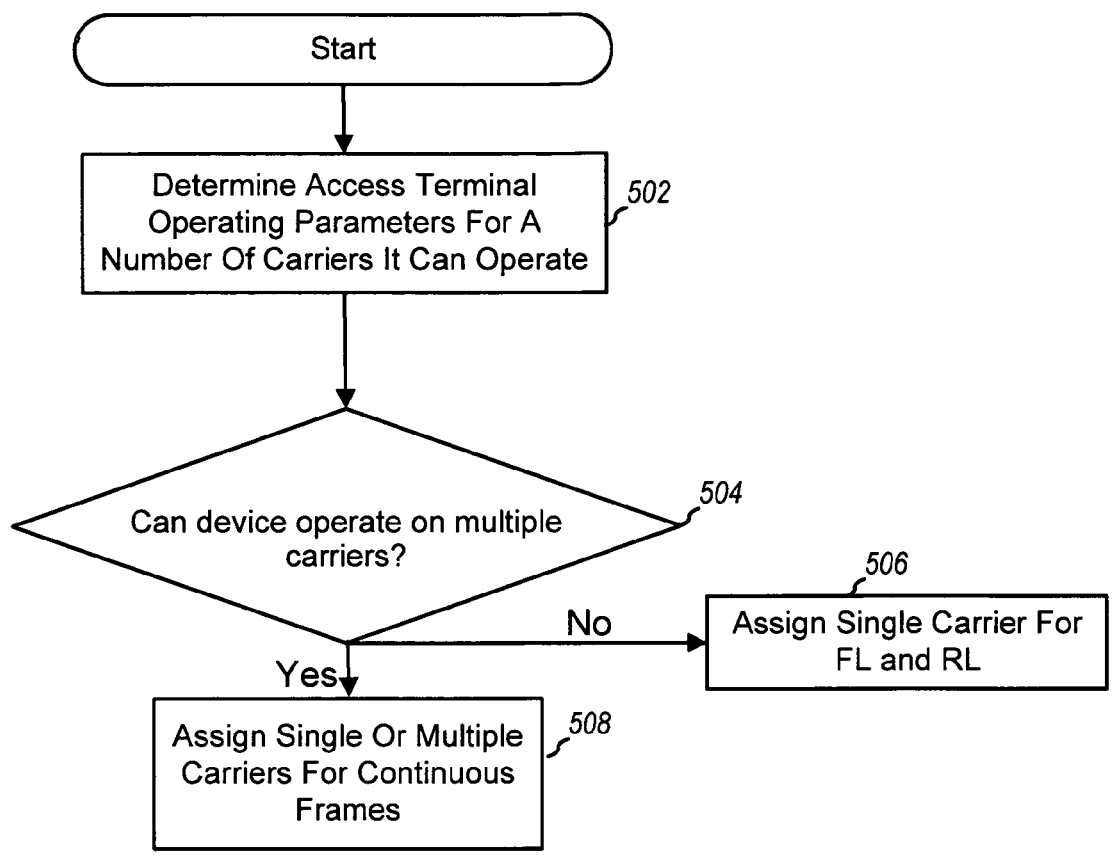
FIG. 5 illustrates aspects of a method of scheduling users in a multi-carrier system.

Referring to FIG. 5, aspects of a method of scheduling users in a multi-carrier system are illustrated. Access terminal operating parameters, for operating on multiple carriers, are determined, block 502. This determination may be made based upon an identification of the access terminal, which is transmitted by the access terminal during initiation of the communication session. Further, session information that is signaled between the access terminal and access point may be utilized to determine this information. Additionally, prior session information may be utilized. Additionally, a database look-up in a central server may be performed to obtain the operating parameters based upon the a device specific identification to the access terminal.

Also, in some aspects, the parameters may be determined by the type of orthogonal or scrambling code utilized by the access terminal to modulate its access request to initiate its communication session. In such a situation, certain orthogonal or scrambling codes utilized for modulating access requests may be reserved for those access terminals that may simultaneously operate on two or more carriers.

In further aspects, the parameters may be determined by the number of carriers the access terminal transmits the access request to initiate its communication session. Further, the carrier or carriers that are utilized by the access terminal to transmit control information, e.g. CQI information, may be utilized to determine its operating parameters with respect to the number of carriers on which it can operate.

Then a determination is made whether the access terminal is capable of operating, e.g. modulating and/or demodulating, on multiple carriers simultaneously, block 504. In certain aspects this determination may be made based upon whether the fast Fourier transform (FFT) capability of the access terminal can simultaneously operate on a number of subcarriers that is equal or greater than the number of subchannels in one carriers, two carriers, all the way to the total number of carriers available in the sector.

As discussed with respect to block 502, the determination may be made on device identification or session specific information, or may be made where the access terminal operates on multiple carriers, e.g. where the access terminal transmits access requests or reverse link control channel information across multiple carriers during communication.

Then, if the access terminal is capable of demodulating and/or modulating multiple carriers simultaneously, it may be scheduled on multiple carriers, block 508. As discussed above, such scheduling may be may be, for example, in the form of scheduling an access terminal for different carriers for reverse link frames and forward link frames in a single superframe, for consecutive superframes, for forward link frames of a single superframe, and/or different reverse link frames of a single superframe.

Alternatively, if the access terminal is not capable of operating on multiple carriers simultaneously, it may be scheduled on a single carrier, block 506. This scheduling may be for multiple consecutive superframes or for the entirety of the communication session with the sector.

Figure 6:
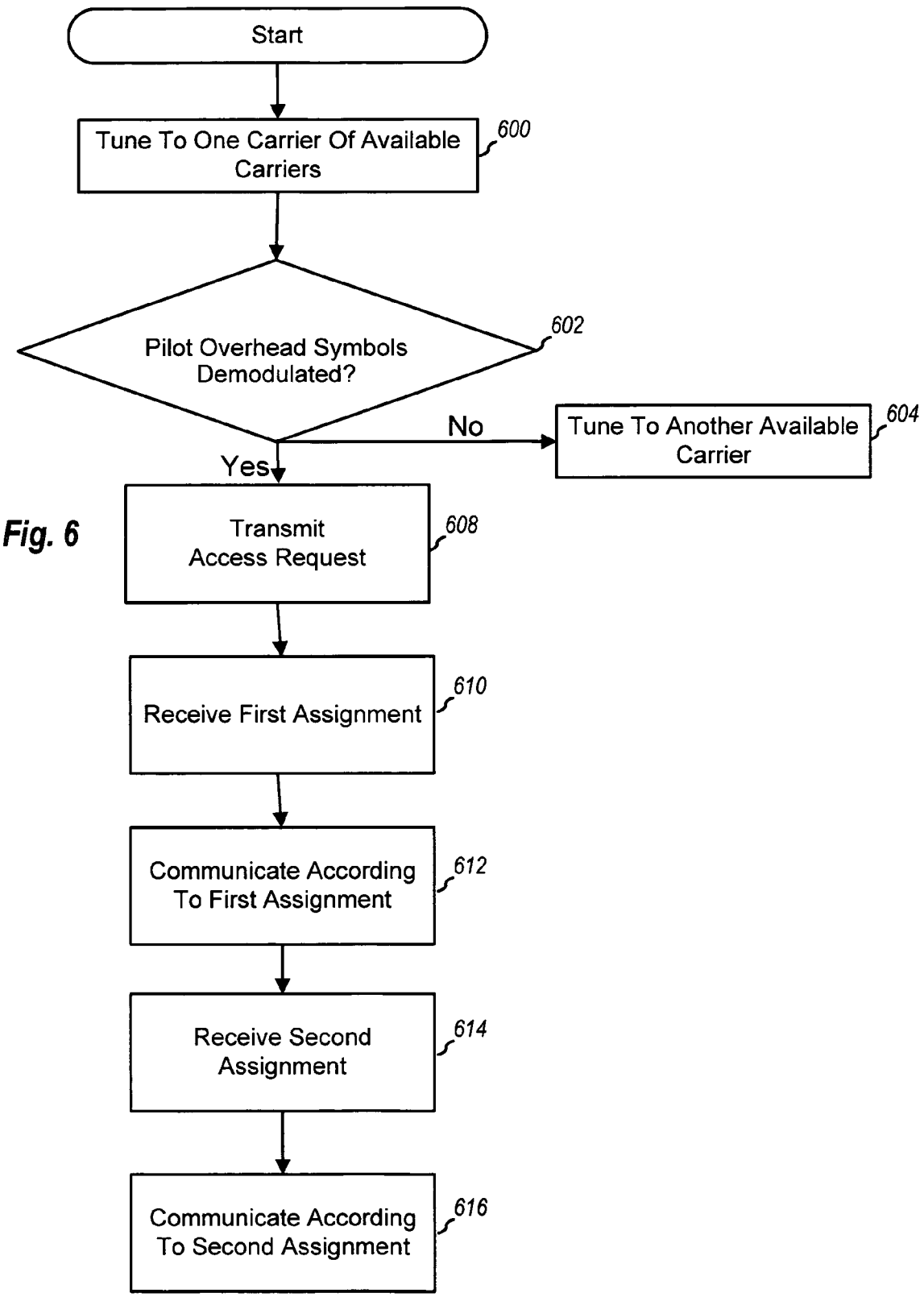
FIG. 6 illustrates aspects of a method of accessing and communicating in a wireless communication system.

Referring to FIG. 6, aspects of a method of accessing and communicating in a wireless communication system is illustrated. An access terminal tunes to one of a plurality of carriers that are available for communication, block 600. The identities of the carriers may be pre-provisioned at the access terminal or may signaled via a known signaling channel. The access terminal will then demodulate acquisition information transmitted by the access point, block 602. This may for example be the information in the superframe preamble of the specific carrier. If this information is properly demodulated by the access terminal, then an access request is transmitted by the access terminal, block 608.

In certain aspects, the access terminal may modulate its access request with an orthogonal or scrambling code that is specific to whether the access terminal may operate utilizing one or more than one carrier simultaneously. The orthogonal or scrambling code indicative of the access terminal type may be pre-provisioned at the access terminal or may be signaled via the acquisition information.

In response to the access request, an access grant message is used to acknowledge the access request and assign initial reverse link subcarriers or block of subcarriers, block 610. In some aspects, the access grant may include a timing adjustment for the access terminal to align its reverse link transmissions with the reverse link timing of the access point. The initial assignment may include whether the access terminal is to operate in a symbol rate or block hopping mode, what are the subcarriers that are assigned for communication in both the forward link and the reverse link, as well as other timing and scheduling parameters. The access terminal will then communicate according to the first assignment, block 612.

A second assignment will later be transmitted to the access terminal, block 614. It should be noted that one or more other assignments may be transmitted between the first and second assignment, block 616. Depending on the access terminal capabilities, the second assignment may include a change carrier message and may identify the carrier for which the next or current assignment will apply. Alternatively, the change carrier message may be transmitted prior to, and independently from the second assignment or any other assignment. Further, the change carrier message may be transmitted as one or more data packets in an assigned forward link frame of the access terminal. The one or more data packets may be acknowledged by the access terminal, thus reliably indicating that the change carrier message has been demodulated. In a further aspect, the access grant itself may include change carrier information, either on an initial basis, or on a per carrier basis if each carrier is accessed separately.

The second assignment, as previously discussed, may include multiple assignments on different carriers that are individually decoded or a joint assignment for more than one carrier received via a single carrier. Also, as previously discussed, this second assignment may be assignment on a single carrier that relates to multiple carriers.

In order to improve operation on newly scheduled carrier's information regarding timing and other information for that carrier may be provided. If one or more data packets are utilized to signal a change carrier message, the data packets may include certain parameters for the new carrier on which the access terminal is being scheduled, thus allowing additional resources to provide the information for proper communication on the new carrier. Alternatively, one or all of the superframe preambles or control channels 306 of each carrier may include information to allow communication utilizing the other carriers, or to allow demodulation of the superframe preamble or, possibly, the control channels of the other carriers. Additionally, a message, e.g. located in the control channel 306, directed to the access terminal may be transmitted that includes the parameters for the new carrier.

The access terminal will then communicate according to the second assignment, block 618. In those cases when the acquisition is not properly demodulated by the access terminal, the access terminal will tune to another carrier, block 604.

Figure 7:
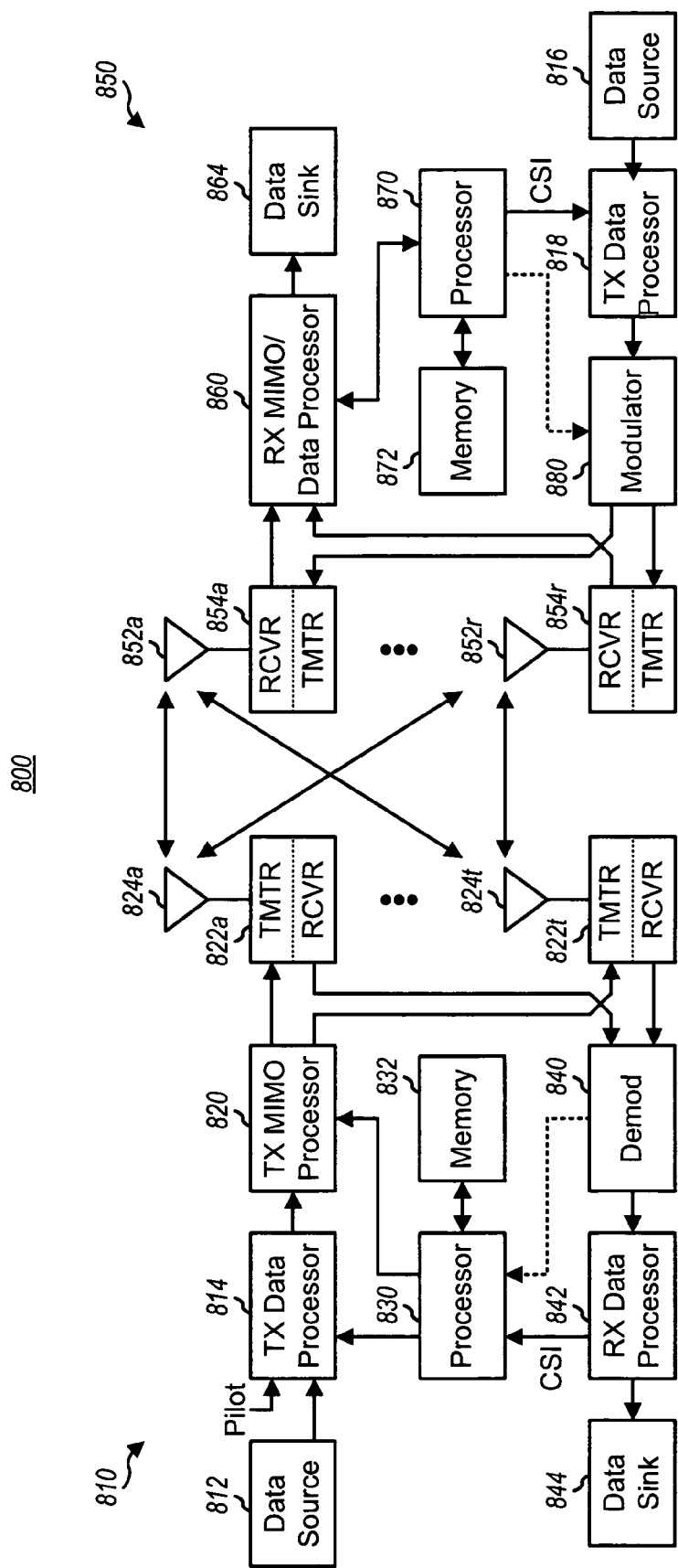
FIG. 7 illustrates aspects of a transmitter and receiver in a multiple access wireless communication system.

Referring to FIG. 7, a block diagram of an embodiment of a transmitter system 810 and a receiver system 850 in a MIMO system 800 is illustrated. At transmitter system 810, traffic data for a number of data streams is provided from a data source 812 to transmit (TX) data processor 814. In an embodiment, each data stream is transmitted over a respective transmit antenna. TX data processor 814 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QSPK, M-PSK, or M-QAM) selected for that data stream to provide modulation symbols. The data rate, coding, and modulation for each data stream may be determined by instructions performed on provided by processor 830.

The modulation symbols for all data streams are then provided to a TX processor 820, which may further process the modulation symbols (e.g., for OFDM). TX processor 820 then provides $N_T$ modulation symbol streams to $N_T$ transmitters (TMTR) 822a through 822t. Each transmitter 822 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transmitters 822a through 822t are then transmitted from $N_T$ antennas 824a through 824t, respectively.

At receiver system 850, the transmitted modulated signals are received by $N_R$ antennas 852a through 852r and the received signal from each antenna 852 is provided to a respective receiver (RCVR) 854. Each receiver 854 conditions (e.g., filters, amplifies, and downconverts) a respective received signal, digitizes the conditioned signal to provide samples, and further processes the samples to provide a corresponding "received" symbol stream.

An RX data processor 860 then receives and processes the $N_R$ received symbol streams from $N_R$ receivers 854 based on a particular receiver processing technique to provide $N_T$ "detected" symbol streams. The processing by RX data processor 860 is described in further detail below. Each detected symbol stream includes symbols that are estimates of the modulation symbols transmitted for the corresponding data stream. RX data processor 860 then demodulates, deinterleaves, and decodes each detected symbol stream to recover the traffic data for the data stream. The processing by RX data processor 818 is complementary to that performed by TX processor 820 and TX data processor 814 at transmitter system 810.

RX data processor 860 may be limited in the number of subcarriers that it may simultaneously demodulate, e.g. 512 subcarriers or 5 MHz, and such a receiver should be scheduled on a single carrier. This limitation may be a function of its FFT range, e.g. sample rates at which the processor 860 may operate, the memory available for FFT, or other functions available for demodulation. Further, the greater the number of subcarriers utilized, the greater the expense of the access terminal.

The channel response estimate generated by RX processor 860 may be used to perform space, space/time processing at the receiver, adjust power levels, change modulation rates or schemes, or other actions. RX processor 860 may further estimate the signal-to-noise-and-interference ratios (SNRs) of the detected symbol streams, and possibly other channel characteristics, and provides these quantities to a processor 870. RX data processor 860 or processor 870 may further derive an estimate of the "operating" SNR for the system. Processor 870 then provides channel state information (CSI), which may comprise various types of information regarding the communication link and/or the received data stream. For example, the CSI may comprise only the operating SNR. The CSI is then processed by a TX data processor 878, modulated by a modulator 880, conditioned by transmitters 854a through 854r, and transmitted back to transmitter system 810.

At transmitter system 810, the modulated signals from receiver system 850 are received by antennas 824, conditioned by receivers 822, demodulated by a demodulator 840, and processed by a RX data processor 842 to recover the CSI reported by the receiver system. The reported CSI is then provided to processor 830 and used to (1) determine the data rates and coding and modulation schemes to be used for the data streams and (2) generate various controls for TX data processor 814 and TX processor 820. Alternatively, the CSI may be utilized by processor 870 to determine modulation schemes and/or coding rates for transmission, along with other information. This may then be provided to the transmitter which uses this information, which may be quantized, to provide later transmissions to the receiver.

Processors 830 and 870 direct the operation at the transmitter and receiver systems, respectively. Memories 832 and 872 provide storage for program codes and data used by processors 830 and 870, respectively.

At the receiver, various processing techniques may be used to process the $N_R$ received signals to detect the $N_T$ transmitted symbol streams. These receiver processing techniques may be grouped into two primary categories (i) spatial and space-time receiver processing techniques (which are also referred to as equalization techniques); and (ii) "successive nulling/equalization and interference cancellation" receiver processing technique (which is also referred to as "successive interference cancellation" or "successive cancellation" receiver processing technique).

While FIG. 7 discusses a MIMO system, the same system may be applied to a multi-input single-output system where multiple transmit antennas, e.g. those on a base station, transmit one or more symbol streams to a single antenna device, e.g. a mobile station. Also, a single output to single input antenna system may be utilized in the same manner as described with respect to FIG. 7.

The transmission techniques described herein may be implemented by various means. For example, these techniques may be implemented in hardware, firmware, software, or a combination thereof. For a hardware implementation, the processing units at a transmitter may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof. The processing units at a receiver may also be implemented within one or more ASICs, DSPs, processors, and so on.

For a software implementation, the transmission techniques may be implemented with modules (e.g., procedures, functions, and so on) that perform the functions described herein. The software codes may be stored in a memory (e.g., memory 830, 872$x$ or 872$y$ in FIG. 7) and executed by a processor (e.g., processor 832, 870$x$ or 870$y$). The memory may be implemented within the processor or external to the processor.

It should be noted that the concept of channels herein refers to information or transmission types that may be transmitted by the access point or access terminal. It does not require or utilize fixed or predetermined blocks of subcarriers, time periods, or other resources dedicated to such transmissions.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

The invention claimed is:

1. A processing system comprising:
an input port;
an output port; and
a processor configured to:
transmit, on a first carrier, a first control channel; and
transmit, on a second carrier within a common sector with the first carrier, a second control channel transmission,
wherein the first control channel transmission and the second control channel transmission include information sufficient to support communication with its access terminal without utilizing information contained in another control channel transmission in another carrier,
wherein the first control channel transmission and the second control channel transmission are transmitted during substantially the same time frame and
wherein the processor is further configured to transmit a superframe preamble that spans each of the first carrier and second carrier prior to transmitting the first control channel transmission and the second control channel transmission.

2. The processing system of claim 1, wherein the processor is further configured to transmit the first control channel transmission and the second control channel transmission synchronously.

3. The processing system of claim 1, wherein the processor is further configured to transmit the first control channel transmission and the second control channel transmission asynchronously.

4. The processing system of claim 1, wherein each of the first carrier and second carrier comprises a bandwidth of 5 MHz.

5. The processing system of claim 1, wherein the processor is further configured to transmit a superframe preamble for each of the first carrier and second carrier prior to transmitting the first control channel transmission and the second control channel transmission.

6. The processing system of claim 1, wherein the processor is further configured to transmit symbol rate hopping transmissions over the first carrier.

7. The processing system of claim 1, wherein the processor is further configured to transmit block hopping transmissions over the first carrier.

8. The processing system of claim 1, wherein the processor is further configured to transmit a change carrier message on at least one of the first carrier and second carrier to instruct its access terminal to demodulate control messages of at least one other carrier.

9. The processing system of claim 8, wherein the change carrier message comprises a data transmission.

10. The processing system of claim 8, wherein the change carrier message comprises a control transmission.

11. The processing system of claim 1, wherein each of the first control channel transmission and the second control channel transmission comprises assignment information for access terminals communicating only on that carrier.

12. The processing system of claim 1, wherein only one of the first control channel transmission and the second control channel transmission comprises assignment information for access terminals communicating on multiple carriers.

13. The processing system of claim 1, wherein each of the first control channel transmission and the second control channel transmission comprises power control information for access terminals communicating on its carrier.

14. The processing system of claim 1, wherein one of the first control channel transmission and the second control channel transmission comprises power control information for access terminals communicating on multiple carriers.

15. A method of wireless communication within a common sector comprising:
    transmitting, on a first carrier, a first control channel transmission; and
    transmitting, on a second carrier a second control channel transmission,
        wherein the first control channel transmission and the second control channel transmission include information sufficient to support communication with its access terminal without utilizing information contained in another control channel transmission in another carrier,
        wherein the first control channel transmission and the second control channel transmission are transmitted during substantially the same time frame and
        wherein the processor is further configured to transmit a superframe preamble that spans each of the first carrier and second carrier prior to transmitting the first control channel transmission and the second control channel transmission.

16. The method of claim 15, wherein the first control channel transmission and the second control channel transmission are synchronous.

17. The method of claim 15, wherein the first control channel transmission and the second control channel transmission are asynchronous.

18. The method of claim 15, wherein each of the first carrier and second carrier comprises a bandwidth of 5 MHz.

19. The method of claim 15, further comprising transmitting a change carrier message on at least one of the first carrier and second carrier to instruct an access terminal to demodulate control messages of at least one other carrier.

20. The method of claim 19, wherein the change carrier message comprises a data transmission.

21. The method of claim 19, wherein the change carrier message comprises a control transmission.

22. The method of claim 15, wherein each of the first control channel transmission and the second control channel transmission comprises assignment information for access terminals communicating only on that carrier.

23. The method of claim 15, wherein only one of the first control channel transmission and the second control channel transmission comprises assignment information for access terminals communicating on multiple carriers.

24. The method of claim 15, wherein each of the first control channel transmission and the second control channel transmission comprises power control information for access terminals communicating on its carrier.

25. The method of claim 15, wherein one of the first control channel transmission and the second control channel transmission comprises power control information for access terminals communicating on multiple carriers.

26. A wireless communication apparatus configured to communicate within a common sector comprising:
    means for transmitting, on a first carrier, a first control channel transmission; and
    means for transmitting, on a second carrier, a second control channel transmission,
        wherein the first control channel transmission and the second control channel transmission include information sufficient to support communication with its access terminal without utilizing information contained in another control channel transmission in another carrier,
        wherein the first control channel transmission and the second control channel transmission are transmitted during substantially the same time frame and
        wherein the processor is further configured to transmit a superframe preamble that spans each of the first carrier and second carrier prior to transmitting the first control channel transmission and the second control channel transmission.

27. The wireless communication device of claim 26, wherein the first control channel transmission and the second control channel transmission are synchronous.

28. The wireless communication device of claim 26, wherein the first control channel transmission and the second control channel transmission are asynchronous.

29. The wireless communication device of claim 26, further comprising means for transmitting a change carrier message on at least one of the first carrier and second carrier to instruct its access terminal to demodulate control messages of at least one other carrier.

30. The wireless communication device of claim 29, wherein the change carrier message comprises a data transmission.

31. The wireless communication device of claim 29, wherein the change carrier message comprises a control transmission.

32. The wireless communication device of claim 26, wherein each of the first control channel transmission and the second control channel transmission comprises assignment information for access terminals communicating only on that carrier.

33. The wireless communication device of claim 26, wherein only one of the first control channel transmission and the second control channel transmission comprises assignment information for access terminals communicating on multiple carriers.

34. The wireless communication device of claim 26, wherein each of the first control channel transmission and the second control channel transmission comprises power control information for access terminals communicating on its carrier.

35. The wireless communication device of claim 26, wherein of the first control channel transmission and the second control channel transmission comprises power control information for access terminals communicating on multiple carriers.

36. A computer-readable medium embodying a program of instructions executable by a processor to perform a method of wireless communication within a common sector, comprising:
    transmitting, on a first carrier, a first control channel transmission; and
    transmitting, on a second carrier, second control channel transmission,
        wherein the first control channel transmission and the second control channel transmission include information sufficient to support communication with its access terminal without utilizing information contained in another control channel transmission in another carrier,
        wherein the first control channel transmission and the second control channel transmission are transmitted during substantially the same time frame and
        wherein the processor is further configured to transmit a superframe preamble that spans each of the first carrier and second carrier prior to transmitting the first control channel transmission and the second control channel transmission.

* * * * *